(12) United States Patent
Radjy

(10) Patent No.: US 9,519,930 B2
(45) Date of Patent: Dec. 13, 2016

(54) SYSTEMS, METHODS AND APPARATUS FOR MANAGEMENT OF A CLOSED LOOP PRODUCTION SYSTEM FOR USE IN THE PRODUCTION OF A FORMULATION-BASED PRODUCT

(71) Applicant: QuipIP, LLC, Pittsburgh, PA (US)

(72) Inventor: Farrokh F. Radjy, Pittsburgh, PA (US)

(73) Assignee: QUIPIP, LLC, Pittsburgh, PA (US)

( * ) Notice: Subject to any disclaimer, the term of this patent is extended or adjusted under 35 U.S.C. 154(b) by 0 days.

(21) Appl. No.: 14/734,734

(22) Filed: Jun. 9, 2015

(65) Prior Publication Data

US 2015/0287125 A1  Oct. 8, 2015

Related U.S. Application Data

(63) Continuation of application No. 14/140,264, filed on Dec. 24, 2013, now Pat. No. 9,082,147, which is a continuation-in-part of application No. PCT/US2013/041661, filed on May 17, 2013, and a continuation-in-part of application No. PCT/US2013/022523, filed on Jan. 22, 2013.

(60) Provisional application No. 61/648,682, filed on May 18, 2012, provisional application No. 61/589,640, filed on Jan. 23, 2012.

(51) Int. Cl.
*G06Q 30/00* (2012.01)
*G06F 17/50* (2006.01)
*G06Q 30/06* (2012.01)

(52) U.S. Cl.
CPC ...... *G06Q 30/0637* (2013.01); *G06Q 30/0635* (2013.01)

(58) Field of Classification Search
CPC .................. G06Q 10/00; G06Q 30/00
USPC .......... 700/106, 96; 705/317, 26.1
See application file for complete search history.

(56) References Cited

U.S. PATENT DOCUMENTS 5,665,254 A * 9/1997 Isono .............. B21F 27/124
140/112
6,944,512 B2 * 9/2005 Breimesser ...... G05B 19/41865
221/7

(Continued)

FOREIGN PATENT DOCUMENTS

JP   2006-023106 A   1/2006
JP   2011-063955 A   3/2011

(Continued)

*Primary Examiner* — Seye Iwarere
(74) *Attorney, Agent, or Firm* — Lucas & Mercanti, LLP

(57) ABSTRACT

An order relating to a formulation-based product is received, wherein fulfilling the order requires production of the formulation-based product at a first location, transport of the formulation-based product in a vehicle to a second location different from the first location, and performance of an activity with respect to the formulation-based product at the second location. First information relating to a first change made to the formulation-based product at the first location is received, from the first location, prior to transport of the formulation-based product. Second information relating to a second change made to the formulation-based product during transport of the formulation-based product is received during transport of the formulation-based product. Third information relating to the activity performed with respect to the formulation-based product at the second location is received from the second location.

21 Claims, 19 Drawing Sheets

(56) References Cited

U.S. PATENT DOCUMENTS

| | | |
|---|---|---|
| 6,966,687 B1 | 11/2005 | Elefsrud |
| 7,092,893 B2 | 8/2006 | Megan |
| 8,280,697 B2* | 10/2012 | Thiel ................. E01C 1/002 |
| | | 700/97 |
| 9,082,147 B2* | 7/2015 | Radjy ............. G06Q 30/0635 |
| 9,194,855 B2* | 11/2015 | Radjy ................. G01N 33/18 |
| 2002/0010525 A1 | 1/2002 | Radjy et al. |
| 2002/0147665 A1 | 10/2002 | Tillery |
| 2003/0145043 A1 | 7/2003 | Matuska |
| 2005/0102320 A1* | 5/2005 | Breimesser ...... G05B 19/41865 |
| 2005/0219940 A1 | 10/2005 | Elefsrud |
| 2007/0056481 A1 | 3/2007 | Gray |
| 2008/0028988 A1 | 2/2008 | Welker |
| 2008/0221815 A1 | 9/2008 | Trost |
| 2008/0264459 A1 | 10/2008 | Wobben |
| 2010/0161366 A1* | 6/2010 | Clemens ............. G06Q 30/06 |
| | | 705/7.29 |
| 2012/0298010 A1* | 11/2012 | Ginn ..................... C01F 5/24 |
| | | 106/464 |
| 2013/0204734 A1* | 8/2013 | Norris ................. G06Q 10/10 |
| | | 705/26.5 |
| 2014/0135967 A1* | 5/2014 | Bippert ............... G06Q 10/04 |
| | | 700/103 |
| 2014/0214627 A1* | 7/2014 | Radjy ............. G06Q 30/0637 |
| | | 705/26.81 |
| 2014/0222209 A1* | 8/2014 | Radjy ..................... B28C 7/02 |
| | | 700/265 |
| 2015/0109287 A1* | 4/2015 | Grichnik ............ G06Q 10/087 |
| | | 345/419 |
| 2015/0213459 A1* | 7/2015 | Radjy ............... G06Q 30/018 |
| | | 705/317 |
| 2015/0247833 A1* | 9/2015 | Radjy .................. G01N 33/18 |
| | | 702/25 |
| 2015/0287125 A1* | 10/2015 | Radjy ............. G06Q 30/0637 |
| | | 705/26.82 |

FOREIGN PATENT DOCUMENTS

| | | |
|---|---|---|
| KR | 10-2007-0042255 A | 4/2007 |
| KR | 10-2008-0072955 A | 8/2008 |
| KR | 10-2009-0038179 A | 4/2009 |
| KR | 10-2009-0114162 A | 11/2009 |

* cited by examiner

SYSTEMS, METHODS AND APPARATUS FOR MANAGEMENT OF A CLOSED LOOP PRODUCTION SYSTEM FOR USE IN THE PRODUCTION OF A FORMULATION-BASED PRODUCT

This application is a continuation of U.S. patent application Ser. No. 14/140,264, filed Dec. 24, 2013, which is a Continuation-in-Part of PCT/US2013/022523, filed Jan. 22, 2013, which claims priority from U.S. Provisional Application No. 61/589,640, filed Jan. 23, 2012, and a Continuation-in-Part of PCT/US2013/041661, filed May 17, 2013, which claims priority from U.S. Provisional Application No. 61/648,682, filed May 18, 2012, the contents of each of which are incorporated herein by reference.

TECHNICAL FIELD

This specification relates generally to systems and methods for managing a production system, and more particularly to systems and methods for managing a production system for a formulation-based product.

BACKGROUND

In many industries, consumers order a product based on a specification, and subsequent to their order, the product is manufactured used on a formulation that specifies a plurality of components and a particular method, procedure, or recipe to be followed. Once the product is made, it is shipped by the producer to the consumer. In such industries where an order is placed prior to manufacturing, orders are based on expected characteristics and costs of the product. When the product is made at a later date, it is important that the product be made and delivered according to the expected characteristics and costs.

In practice, however, changes often occur during the manufacturing and shipping process due to a variety of factors, such as an unavailability of components, a failure to include the correct quantity of a component specified in the recipe, or the addition of a component that is not listed in the formulation. Such changes may occur due to human error, either accidental or deliberate, or due to malfunction of a device involved in the production system, or due to unforeseen events. Furthermore, a component specified in the formulation may be incorrectly batched, or knowingly or unknowingly replaced with assumed equivalent components because the raw materials are not available, or for other reasons. One well known example is the use of either sucrose or high fructose corn syrup in soft drinks. Typically, during production of a soft drink, one of these two sweeteners is selected and used depending upon the cost and availability of the sweetener at the time when the soft drink product is manufactured.

Similar practices are used in the ready mix concrete industry. A given mixture of concrete, defined by a particular formulation (specifying types of components and quantities thereof), may be produced differently at different production facilities and/or at different times, depending a variety of factors. For example, the types and quantities of cement and Pozzolanic cementitious materials, chemicals, different types of aggregates used often varies between batches, due to human error, or for reasons which may be specific to the time and location of production. Some components may not be available in all parts of the world, a component may be incorrectly batched, components may be replaced deliberately or accidentally. Furthermore, in the ready mix concrete industry, it is common for changes in the mixed composition to occur during transport of the product. For example, water and/or chemicals may be added due to weather, or due to the length of time spent in transit to the site where the ready mix concrete is poured. Changes to a mixture may also occur during the botching process. For example, an incorrect amount of a critical component such as water or cementitious may be added. Similarly, an incorrect amount of fly ash or other pozzolans, such as slag, may be used to make the cementitious portion.

Due to the reasons set forth above, a customer often receives a product which differs from the product ordered. The quality of the product may not meet expectations. Furthermore, any change made to a product may impact the producer's cost and profits.

In addition, in many industries, various activities important to a producer's business, such as sales, purchasing of raw materials, production, and transport, are conducted independently of one another. The disjointed nature of the sales, purchasing of raw materials, production, and transport creates an additional hindrance to the producer's, and the customers, ability to control the quality and cost of the final product.

Accordingly, there is a need for improved production management systems that provide, to producers and to customers, greater control over various aspects of the production system used to produce a product, and thereby provide greater control over quality and costs.

SUMMARY

In accordance with an embodiment, a production management system is provided. The production management system is used in the production of a product made from a formulation specifying a mixture of individual components, where the customer orders the product prior to its manufacture. System and methods described herein allow a user to manage costs, and the quality of the product, from the point of order, through the production process, transport of the product, and delivery of the product to the customer. In one embodiment, a master database module communicates with the sales, purchasing, manufacturing and shipping systems to monitor and control costs and quality of the product at various stages in the sales, production, and delivery cycles.

In one embodiment, systems used for sales, purchasing of raw materials, manufacturing of the product, and shipping of a product are tied together to allow for the management and control of cost and quality of the product. Systems and methods described herein allow for different ownership of different data while allowing others to use the data so as to perform their function. Thus, a user may own the mixture data but allow the manufacturer to use the mixture data in order to make the product. Such ownership is accomplished by having a single gateway to add data to the system and by using a single master database.

By using a single master database which stores all of the data relating to the mixture, the components to make the mixture, the method to make the mixture, specifics about the products to include its costs, methods of shipment as well as costs associated with each one of these items, quality and costs are managed during production.

Furthermore, changes made at any point during the manufacturing process are transmitted to the master database so that a record is maintained on the product. This allows real time costs and real time quality control of the product. Thus, variations are minimized between budget goats and operations, both theoretically and actually.

In addition, alerts may be issued when the actual values vary from the theoretical values. Thus, if one component is replaced with an equivalent, the master database is notified and an alert may be generated if the replacement component is not within specified tolerances. Alternatively, if one or more components are batched in the manufacturing process in amounts exceeding specified tolerances as compared to the target, theoretical amounts for each component, then an alert may be issued.

By tying together the systems used for sales, purchasing of components and raw materials, maintaining formulations of mixtures, production of the mixtures and products and the shipping of the products, through a master database, improved management of quality and costs may be achieved.

Actual and theoretical data may be captured and stored in the master database. Comparisons between theoretical and actual values are made and alerts are generated when the actual falls outside the tolerances set by the theoretical. Such alerts are done in real time because each of the separate units used for purchasing, manufacturing and transport provide feedback to the master database.

Accordingly, in one embodiment, a method of managing a production system is provided. An order relating to a formulation-based product is received, wherein fulfilling the order requires production of the formulation-based product at a first location, transport of the formulation-based product in a vehicle to a second location different from the first location, and performance of an activity with respect to the formulation-based product at the second location. The order may be received by a processor such as a master database module linked to a network, for example. First information relating to a first change made to the formulation-based product at the first location is received, from the first location, prior to transport of the formulation-based product. Second information relating to a second change made to the formulation-based product during transport of the formulation-based product is received during transport of the formulation-based product. Third information relating to the activity performed with respect to the formulation-based product at the second location is received from the second location.

In one embodiment, the formulation-based product is produced based on a formulation specifying a plurality of components and a respective quantity for each respective component. The formulation may also specify a method of manufacturing the product.

In another embodiment, the first location comprises a production facility capable of producing the formulation-based product.

The first change may comprise a substitution of a selected component specified in the formulation by a second component. Alternatively, the first change may comprise a change in a quantity of a component specified in the formulation.

In another embodiment, the vehicle comprises a truck, an automobile, a train, an airplane, or a ship.

In another embodiment, the formulation-based product is a concrete mixture, and the vehicle comprises a concrete mixer truck. The second change comprises one of an addition of water to the concrete mixture and an addition of a selected chemical to the concrete mixture. The second location may comprise a construction site, for example. The activity may comprise, for example, delivery of the concrete mixture to the construction site and/or laying down of the concrete mixture at the construction site.

In other embodiments, the formulation-based product may be any type of product that is manufactured based on a formulation. For example, the formulation-based product may be a chemical compound or other type of chemical-based product, a petroleum-based product, a food product, a pharmaceutical drug, etc. Systems, apparatus and methods described herein may be used in the production of these and other formulation-based products.

In accordance with another embodiment, a production management system comprises the components set forth below:

- a master data module having stored therein mixtures, components used to make the mixtures, amounts of each of the components in the mixtures and a first cost associated with each of the components;
- an input module in communication with the master database module and transmitting the mixtures, the components, amounts of each of the components in the mixtures, and first cost to the master database module;
- a sales module in communication with the master database module, the sales module receiving displays of the mixtures, the components, amounts of each of the components in the mixtures, and the first costs, and the sales module transmitting orders of the mixtures to the master database module from a user of the sales module;
- a production module in communication with the master database module and associated with a production facility, the production module receiving orders for the, mixtures, the production facility makes the mixtures and the production module transmitting changes made to the mixture during making of the mixture to the master database module;
- a transport module in communication with the master database module and associated with a transport vehicle, the transport vehicle receiving the mixture from the production facility and transporting the mixture to a site, and the transport module transmitting changes made to the mixture during transport of the mixture to the site to the master database module; and
- an alert module in communication with a master database module and receiving alerts of unacceptable changes to the mixture from the master database module and forwarding the same to the user.

In one embodiment, the input module transmits acceptable tolerances of the mixtures to the master database module and the master database module stores the acceptable tolerances, and the master database module generates the unacceptable change alerts based on a comparison of acceptable tolerances and the changes.

The input module may transmit performance characteristics of the mixture to the master database module. The master database module stores the performance characteristics, and the sales module receives from the master database module the performance characteristics and displays the performance characteristics to the sales module.

The input module may transmit to the master database module, second costs associated with mixing the components to make the mixture and third costs associated with transporting the mixture to the site. The master database module stores the second and third costs and the sales module receives from the master database module and displays the second and third costs.

The system may also include as purchasing module in communication with the master database module and associated with a raw materials supply facility. The purchasing module receives orders for the raw materials used to make the mixture from the master database module and transmit to the master database module actual costs of the components purchased. The master database module compares the actual costs of components purchased to a theoretical cost of components and transmits an alert to the alert module if the actual costs of the component exceed an acceptable tolerance for the theoretical costs of the components. Purchased raw materials are sent to the production facility.

In accordance with another embodiment, a production management system is provided. The system comprises a master database module having stored therein a mixture formulation associated with a mixture, components used to make the mixture formulation and amounts of each of the components in the mixture formulation, and a production module associated with a production facility located in a locality, the production module being in communication with the master database module, the production module being configured to manage aspects of production of the mixture. The system also includes a localization module configured to identify a local factor relating to use of a selected component of the mixture formulation in the locality, and generate, a localized version of the mixture formulation based on the local factor. The master database module receives an order for the mixture. The master database module provides the localized version of the mixture formulation to the production module in response to the order. The production module causes the mixture to be produced at the production facility based on the localized version of the mixture formulation.

The system may also include a sales module configured to present a plurality of mixtures to a customer, receive the order from the customer, and transmit the order to the master database module.

In one embodiment, the system further comprises a transport module configured to monitor one or more parameters daring transport of the mixture from the production facility to a delivery site, and to transmit to the master database module an alert relating to the one or more parameters.

In another embodiment, the production module informs the master database module of changes made to the mixture formulation during production of the mixture.

In accordance, with another embodiment, a method of producing a formulation-based product is provided. A formulation of a product, comprising a plurality of components and respective quantities, is stored, for example, in a database. A plurality of production facilities capable of producing the product are identified, each production facility being associated with a respective locality. For each respective one of the plurality of production facilities, a series of steps is perforated, including identifying a factor that is associated the corresponding locality and relates to a particular one of the plurality of components, and modifying the formulation, based on the factor, to generate a localized version of the formula, for use at the respective production facility.

In one embodiment, the localized version of the formulation is stored in association with the formulation. Modifying the formulation may further comprise modifying a quantity associated with the particular one of the plurality of components. Modifying the formulation may also comprises adding a second component to the formulation.

In another embodiment, a second plurality of production facilities is selected from among the plurality of production facilities. For each of the second plurality of production facilities, a respective localized version of the formulation associated with the respective production facility is transmitted to a system associated with the respective production facility.

In another embodiment, the factor comprises one of a local cost factor, a local product availability factor, and a local market preference factor.

In accordance with another embodiment, a method of managing production and delivery of a formula-based product is provided. An order for a mixture selected from among the plurality of mixtures, the order being associated with a purchase of the mixture by a customer, is received, by a processor, from a sales module operating on a first device different from the processor. A mixture formulation defining a plurality of components and respective quantities required to produce the selected mixture is provided, by the processor, to a production module operating on a second device located at a production facility capable of producing the mixture. First information identifying a modification made to the mixture formulation is received, by the processor, from the production module, prior to production of the mixture. Second information indicating an actual quantity of the mixture produced is received, from the production module, prior to deliver of the mixture. Third information identifying a change made to the mixture produced during transport of the mixture is received, from a transport module operating on a third device located on a vehicle transporting the mixture produced from the production facility to a delivery site. Fourth information relating to delivery of the mixture produced is received, from a site module operating on a fourth device associated with the delivery site. Fifth information relating to a performance of the mixture after delivery of the mixture is received from the site module. An alert is transmitted when one of the first information, the second information, the third information, the fourth information, and the fifth information does not satisfy a respective predetermined criterion.

In one embodiment, the modification made to the mixture formulation comprises a replacement of a selected component of the mixture by an equivalent component.

In another embodiment, the third information relates to one of an addition of water to the mixture during transport and of an addition of water to the mixture during transport.

In another embodiment, sixth information relating to one of a temperature detected during transport of the mixture, a length of travel of the mixture, during transport is received from the transport module.

In another embodiment, the fifth information comprises one of a measurement of an actual heat of hydration taken from a fresh state through a hardening process, a strength characteristic of the concrete mixture after it is hardened.

These and other advantages of the present disclosure will be apparent to those of ordinary skill in the art by reference to the following Detailed Description and the accompanying drawings.

DETAILED DESCRIPTION

Figure 1A:
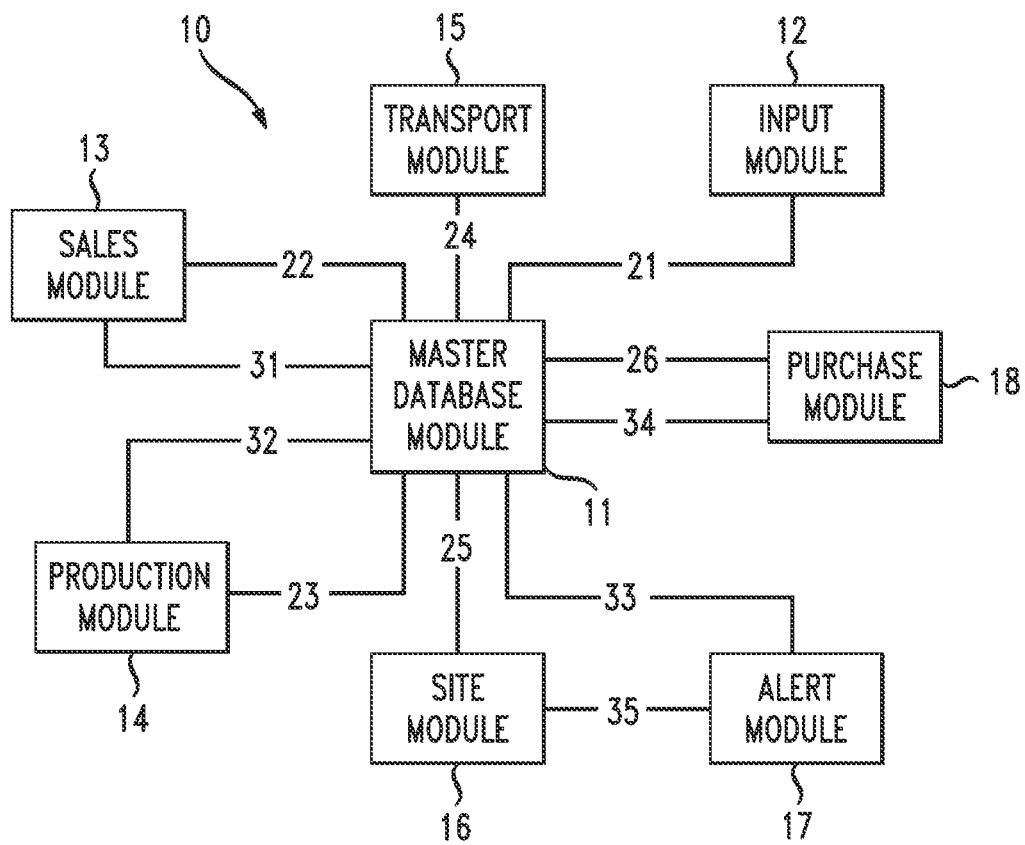
FIG. 1A illustrates a product management system in accordance with an embodiment.

In accordance with embodiments described herein, systems and methods of managing a closed-loop production management system used for production and delivery formulation-based product are provided. Systems, apparatus and methods described herein are applicable to a number of industries, including, without limitation, the food manufacturing industry, the paint industry, the fertilizer industry, the chemicals industry, the oil refining industry, the pharmaceuticals industry, agricultural chemical industry and the ready mix concrete industry.

In accordance with an embodiment, a method of managing a closed loop production system is provided. An order relating to a formulation-based product is received, wherein fulfilling the order requires production of the formulation-based product at a first location, transport of the formulation-based product in a vehicle to a second location different from the first location, and performance of an activity with respect to the formulation-based product at the second location. First information relating to a first change made to the formulation-based product at the first location is received, from the first location, prior to transport of the formulation-based product. Second information relating to a second change made to the formulation-based product during transport of the formulation-based product is received during transport of the formulation-based product. Third inform at on relating to the activity performed with respect to the formulation-based product at the second location is received from the second location. The first, second and third information are stored in a data structure, and may be displayed with an analysis of the impact of selected information on the cost of the product.

In one illustrative embodiment, systems, apparatus and methods described herein are employed in a closed-loop production management system used for production and delivery of a ready mix concrete product. A processor receives, in real time, an order relating to a sale of a concrete mix are associated with a mixture formulation, first information identifying a modification made to the mixture formulation prior to production of the concrete mixture, second information indicating an actual quantity of the concrete mixture produced, third information identifying a change made to the concrete mixture produced during transport of the mixture, fourth information relating to delivery of the mixture produced, and fifth information relating to performance of the mixture after delivery. The first information, second information, third information, fourth information and fifth information are stored in a data structure, such as a database, for example. An alert is transmitted when one of the first information, the second information, the third information, and the fourth information does not satisfy a respective predetermined criterion.

In one embodiment, the processor operates within a product management system comprising a plurality of modules operating at independent locations associated with various stages of the ordering, production, transport and delivery of the product.

In accordance with an embodiment, the product is a formulation-based product. In one embodiment, the product is a formulation-based concrete product. In other embodiments, the formulation-based product may be any type of product that is manufactured based on a formulation. For example, the formulation-based product may be a chemical compound sir other type of chemical-based product, a petroleum-based product, a food product, a pharmaceutical drug, etc. Systems, apparatus and methods described herein may be used in the production of these and other formulation-based products.

FIG. 1A illustrates a production management system in accordance with an embodiment. Product management system 10 includes a master database module 11, an input module 12, a sales module 13, a production module 14, a transport module 15, a site module 16, an alert module 17 and a purchasing module 18.

Master database module 11 may be implemented using a server computer equipped with a processor, a memory and/or storage, a screen and a keyboard, for example. Modules 12-18 may be implemented by suitable computers or other processing devices with screens for displaying and keep displaying data and keyboards for inputting data to the module.

Master database module 11 maintains one or more product formulations associated with respective products. In the illustrative embodiment, formulations are stored in a database; however, in other embodiments, formulations may be stored in another type of data structure. Master database module 11 also stores other data related to various aspects of production management system 10. For example master database module may store information concerning acceptable tolerances for various components, mixture, production processes, etc., that may be used in system 10 to produce various products. Stored tolerance information may include tolerances regarding technical/physical aspects of components and processes and may also include tolerances related to costs. Master database module 11 may also store cost data for various components and processes that may be used in system 10.

Each module 12-46 and 18 transmits data to master database module 11 by communication lines 21-26, respectively. Master database module 11 transmits data to modules 13, 14, 17 and 18 by communication lines 31-34, respectively. Each communication line 21-26 and 31-34 may comprise a direct communication link such as a telephone line, or may be a communication link established via a network such as the Internet, or another type of network such as a wireless network, a wide area network, a local area network, an Ethernet network, etc.

Alert module 17 transmits alerts to customers by communication line 35 to site module 16.

Master database module 11 stores data inputted from modules 12-46 and 18. Master database module 11 stores data in a memory or storage using a suitable data structure such as a database. In other embodiments, other data structures may be used. In some embodiments, master database module 11 may store data remotely, for example, in a cloud-based storage network.

Input module 12 transmits to master database module 11 by communication line 21 data for storage in the form of mixture formulations associated with respective mixtures, procedures for making the mixtures, individual ingredients or components used to make the mixture, specifics about the components, the theoretical costs for each component, the costs associated with mixing the components so as to make the product or mixture, the theoretical characteristics of the product, acceptable tolerances for variations in the components used to make the product, the time for making and delivering the product to the site and costs associated shipping the product.

The terms "product" and "mixture" are used interchangeably herein.

Data transmitted by input module 12 to master database module 11 and stored in master database module 11 may be historical in nature. Such historical data may be used by the sales personal through sales module 13 to make sales of the product.

In one embodiment, sales module 13 receives product data by communication line 31 from master database module 11 relating to various products or mixtures that are managed by system 10, the components that make up those products/mixtures, the theoretical costs associates with the components, making the mixture and delivery of the mixture, times for delivery of the mixture and theoretical characteristics and performance specifications of the product.

Figure 1B:
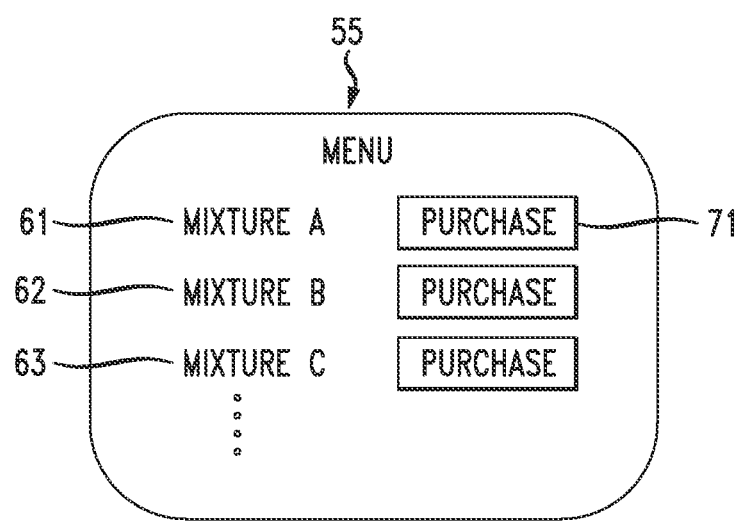
FIG. 1B shows an exemplary menu that may be presented to a customer in accordance with an embodiment.

Sales module 13 may present all or a portion of the product data to a customer in the form of a menu of options. FIG. 1B shows an exemplary menu 55 that may be presented to a customer in accordance with an embodiment. Menu 55 comprises a list of mixtures available for purchase, including Mixture A (61) Mixture (62), Mixture C (63), etc. Each mixture shown in FIG. 1B represents a product offered for sale. For example, each mixture may be a respective concrete mixture that may be purchased by a customer. Menu 55 is illustrative only; in other embodiments, a menu may display other information not shown in FIG. 1B. For example, a menu may display the components used in each respective mixture, the price of each mixture, etc.

From the menu, the customer may choose one or more products to purchase. For example, a customer may purchase Mixture A (61) by selecting a Purchase button (71). When the customer selects a mixture (by pressing Purchase button (71) for example), sales module 13 generates an order for the selected mixture and transmits the order by communication line 22 to master database module 11. The order may specify the mixture selected by the customer, the components to be used to make the selected mixture, a specified quantity to be produced, delivery site the delivery date for the product, etc. An order may include other types of information.

In accordance with an embodiment, the customer may input a specially product into system 10. Such input may be accomplished through input module 12.

Figure 10:
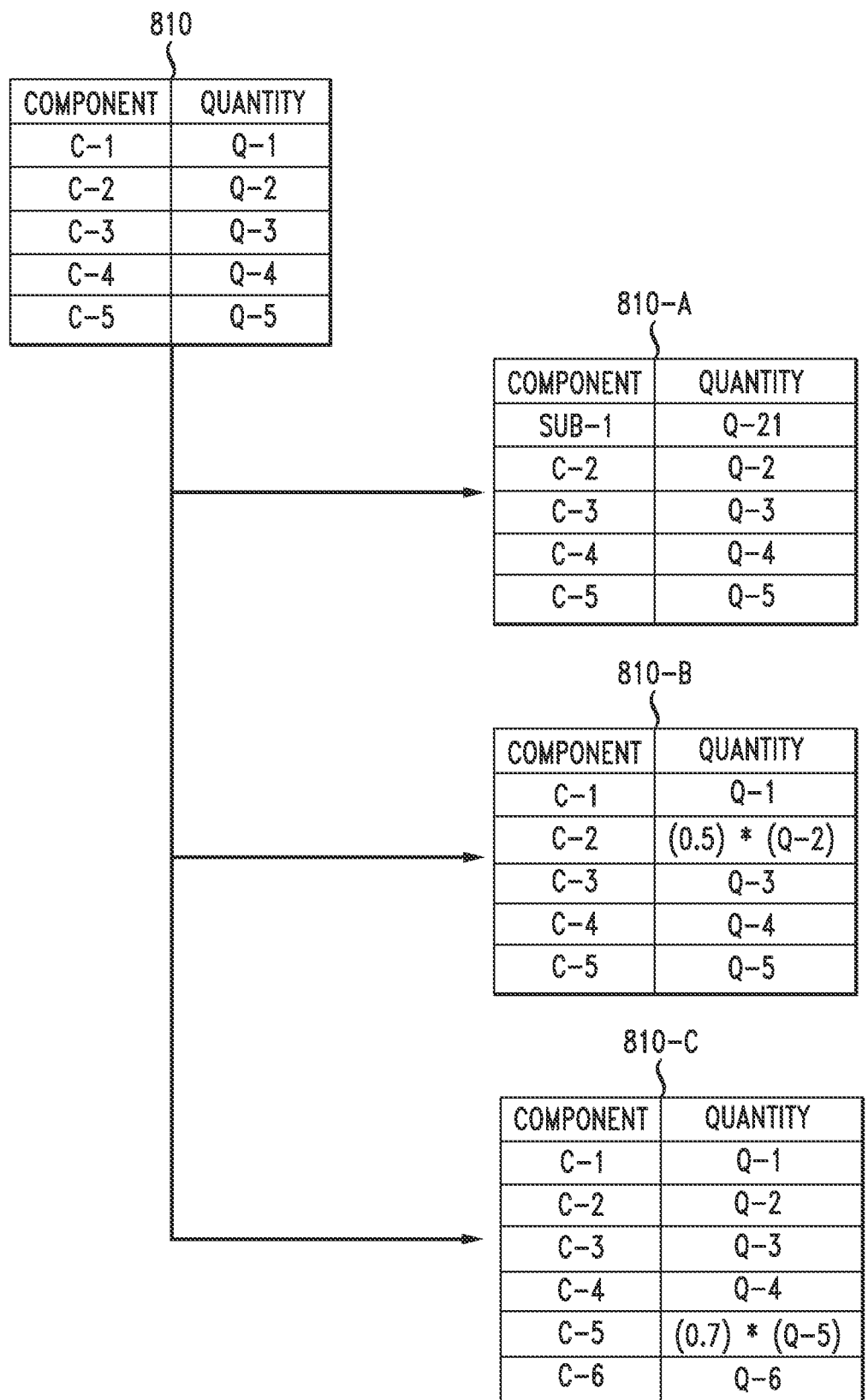
FIG. 10 shows a mixture formulation and several localized versions of the mixture formulation in accordance with an embodiment.

Customer orders are transmitted to master database module 11. Master database module 11 uses an integrated database system to manage information relating to the orders, as well as the production, transport, and delivery of the ordered products. FIG. 10 is a flowchart of a method of managing a production system in accordance with an embodiment. At step 81, an order relating to a formulation-based product is received, wherein fulfilling the order requires production of the formulation-based product at a first location, transport of the formulation-based product in a vehicle to a second location different from the first location, and performance of an activity with respect to the formulation-based product at the second location. As described above, the customers order is transmitted to master database module 11. Master database module receives the order from sales module 13, and stores the order.

Based on the order inputted to master database module 11, master database module 11 places a production order for production of the product to production module 14 by communication line 32. Production module 14 is located at a production facility capable of manufacturing the purchased product in accordance with the order.

In the illustrative embodiment, the product is a formulation-based product. Thus, the product may be produced based on a formulation defining a plurality of components and respective quantities for each of the components. The formulation may also specify a method, or recipe, for manufacturing the product. The production order provided to the production module 14 may include the mixture or product to be made, the components to be used to make the mixture or product, the specifics about the individual components, the method to make the mixture and the delivery dates. The product is produced at the production facility and placed in a vehicle for transport to a delivery site specified in the order.

At step 83, first information relating to a first change made to the formulation-based product at the first location is received from the first location, prior to transport of the formulation-based product. If any changes are made to the product at the production facility, production module 14 transmits information relating to such changes to master database module 11. For example, a particular component specified in the formulation may be replaced by an equivalent component. In another example, a quantity of a selected component specified in the formulation may be altered. Master database module 11 receives and stores such information.

At step 85, second information relating to a second change made to the formulation-based product during transport of the for product is received during transport of the formulation-based product, if any changes are made to the product during transport of the product, transport module 15 transmits information relating to such changes to master database module 11. Master database module 11 receives and stores such information.

Upon arrival at the specified delivery site, the product is delivered. At step 87, third information relating to the activity performed with respect to the formulation-based product at the second location is received from the second location. For example, site module 16 may transmit to master database module 11 information indicating the time of delivery, information relating to the performance of the product after delivery.

In the illustrative embodiment, information transmitted among module 11-19, and to a producer or customer, may be transmitted in the form of an alert. An alert may be any suitable form of communication. For example, an alert may be transmitted as an electronic communication, such as an email, a text message, etc. Alternatively, an alert may be transmitted as an automated voice message, or in another form.

In one embodiment, information is transmitted to master database module 11 in real time. For example, strict rules may be applied requiring that any information concerning changes to a product that is obtained by any module (including production module 14, purchase module 18, transport module 15, site module 16, etc.) be transmitted to master database module 11 within a predetermined number of milliseconds.

Various embodiments are discussed in further detail below.

Figure 2:
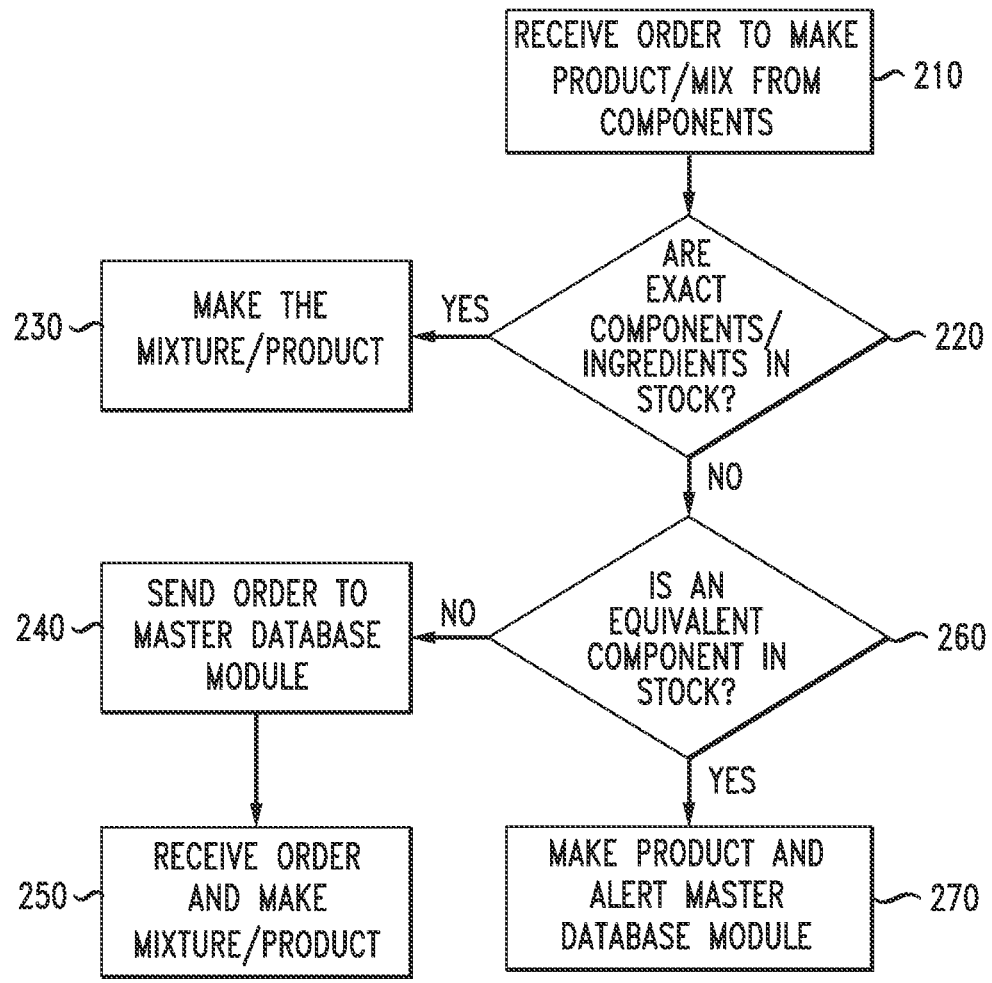
FIG. 2 is a flowchart of a method of producing a mixture in accordance with an embodiment.

As described above, in some embodiments, the product is made at a production facility in accordance with a predetermined formulation. Production module 14 operates at the production facility and has stored data as to the specifics of the individual components or raw ingredients on hand at the facility. FIG. 2 is a flowchart of a method of producing a mixture in accordance with an embodiment. At step 210, an order to make a product/mixture from specified components is received. Referring to block 220, if the exact components or ingredients are in stock, the production facility proceeds to make the mixture/product (step 230). If the production facility does not have on hand the exact components needed to make the mixture/product, then the method proceeds to step 260 and determines whether an equivalent component is in stock. If an equivalent component is in stock, the method proceeds to step 270. At step 270, production module 14 makes the product using the equivalent component and alerts master database module 11 of the change. Such a replacement may change the cost of the raw materials and/or the characteristics of the mixture/product which is finally made.

Returning to block 260, if there is no equivalent component in stock, the production module 14 may send an order by communication line 32 to master database module 11 (Step 240) for the specified component (or for the equivalent component). When the order is received, production module 14 makes the product (step 250).

In another embodiment, production module 14 alerts master database module 11 if the method of manufacture specified in a mixture formulation is modified. For example, a step of the method may be changed or eliminated, or a new step may be added. Master database module stores information related to the change. Master database module 11 may also determine if the change is within acceptable tolerances and alert the customer if it is not within acceptable tolerances. For example, master database module 11 may compare the modified method to stored tolerance information to determine if the modified method is acceptable.

Figure 3:
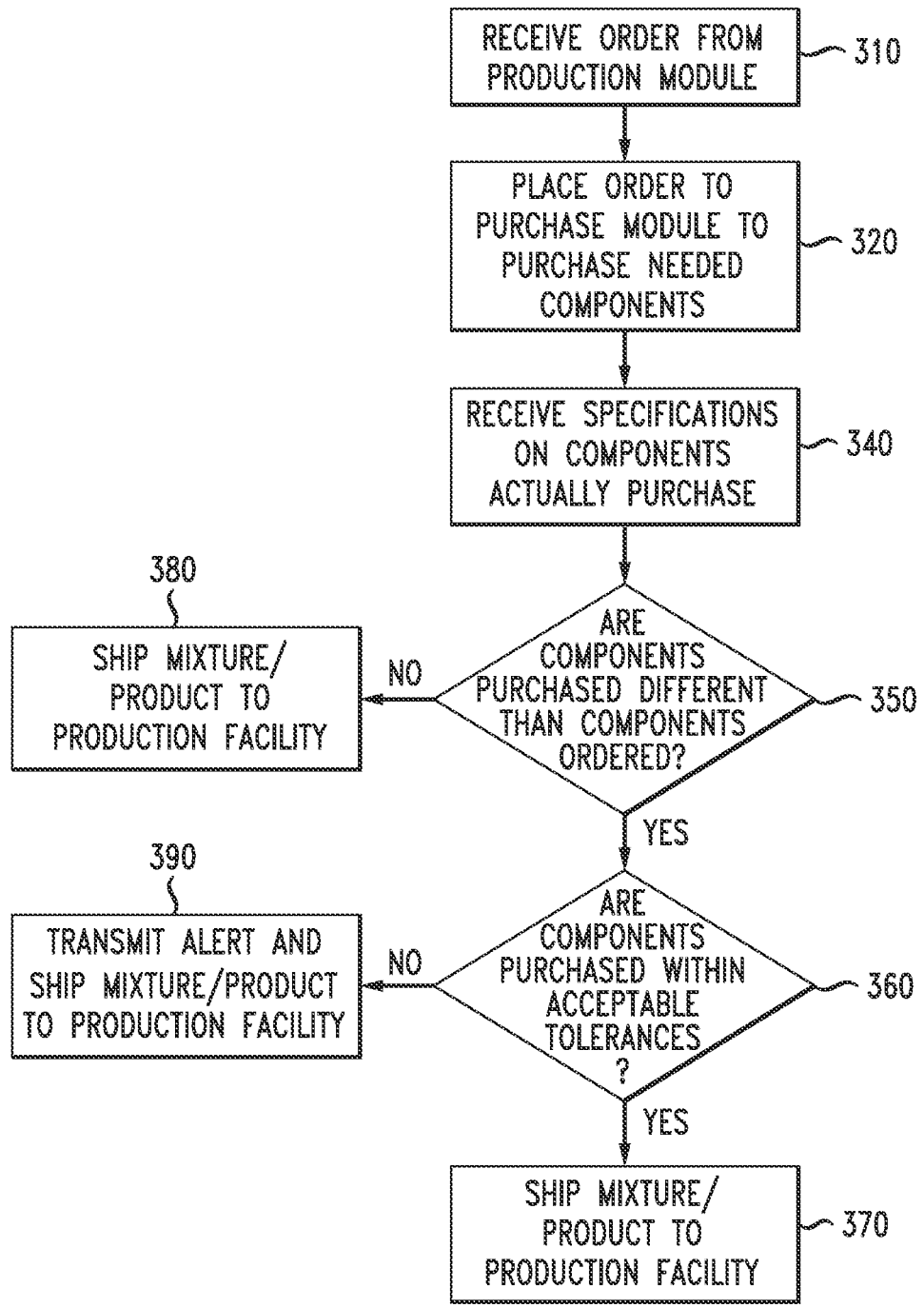
FIG. 3 is a flowchart of a method of handling an order received from a production facility in accordance with an embodiment.

FIG. 3 is a flowchart of a method of handling an order received from a production facility in accordance with an embodiment. At step 310, an order is received from production module 14, by master database module 11. At step 320, master database module 11 places an order by communication line 34 to purchase module 18 to purchase the needed components or raw materials. Purchase module 18 transmits by communication line 26 the specifics of the components that it has purchased and the estimated delivery date to the production facility as well as the costs associated with the component. Purchase module 18 is associated with a raw material/component supply facility. At step 340, master database module 11 receives the specifics on the components actually purchased by purchase module 18.

Figure 1C:
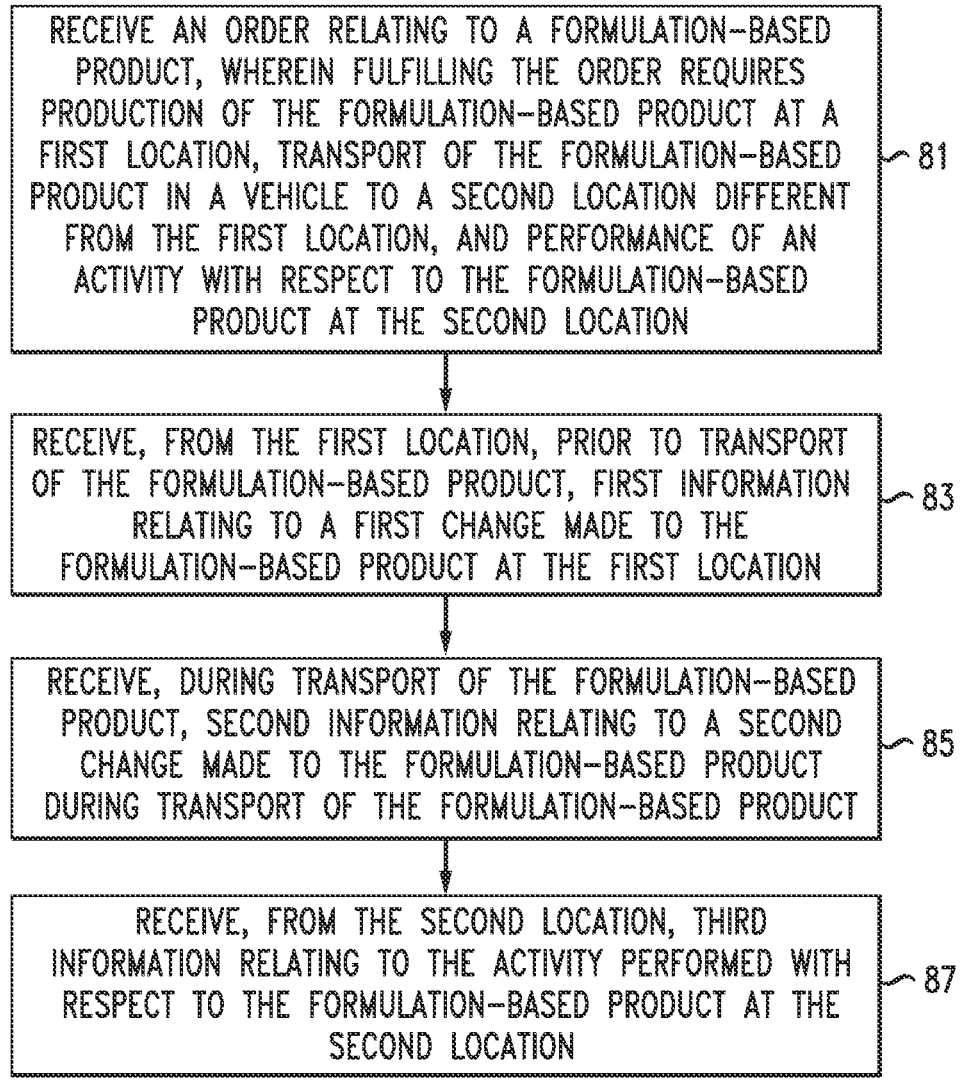
FIG. 1C is a flowchart of a method of management a production system in accordance with an embodiment.

Referring to block 350, if the components purchased (by purchase module 18) are the same as the order placed the method proceeds to step 380, and the product is shipped to the production facility, if the components purchased (by purchase module 18) differ from those specified in the order, the method proceeds to block 360. Master database, module 11 compares the components purchased, either those replaced by the production facility or those purchased by the purchase module 18, to stored tolerance information (which may include tolerances regarding physical/technical aspects of a component and/or cost tolerances). Referring to block 360, if the replacement components fall within acceptable tolerances both for performance characteristics and cost, then production is continued and, at step 370, the order is shipped to the production facility, if the cost or characteristics of the raw ingredients fall outside acceptable tolerances, then the method proceeds to step 390. At step 390, master database 11 tram its an alert by communication line 33 to alert module 17 and the components are shipped to the production facility. Alert module 17 receives the alert from master database module 11 and, in response, transmits by communication lines 35 an alert to the customer. As shown in FIG. 1, the alert from alert module 1 is transmitted by communication lines 35 to site module 16.

Figure 4:
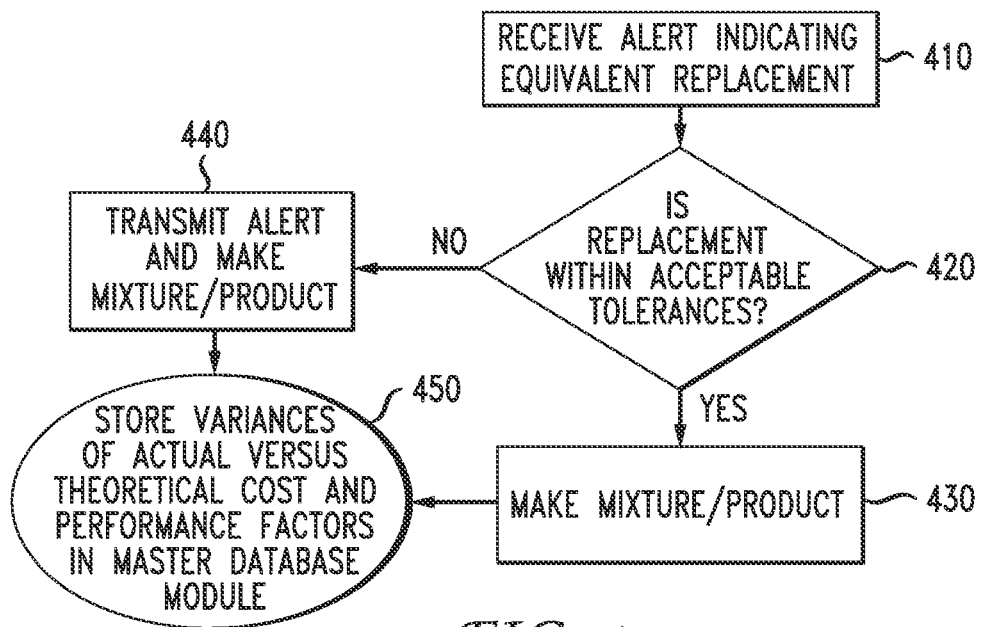
FIG. 4 illustrates a method of responding to an alert when a production facility replaces an ingredient with a known equivalent, in accordance with an embodiment.

FIG. 4 is a flowchart of a method of responding to an alert in accordance with an embodiment. Specifically, FIG. 4 illustrates a method of responding to an alert when a production facility replaces an exact ingredient with a known equivalent, in accordance with an embodiment. At step 410, an alert indicating an equivalent replacement is received by master database module 11 from production module 14. Referring to block 420, a determinations made by master database module 11 whether the equivalent component is within acceptable tolerances. If the equivalent component is within acceptable tolerances, the method proceeds to step 430 and the product is made. Master database module 11 instructs production module 14 to proceed with manufacturing the mixture. If the equivalent component is not within acceptable tolerances, the method proceeds to step 440. At step 440, and an alert is transmitted and the product is made. For example, an alert may be transmitted by master database module 11 or by alert module 17 to the customer.

At step 450, the variances of actual versus theoretical cost and performance factors are stored at master database module 11.

As described above, production module 14 receives instructions from master database module 11, prior to production of a mixture, specifying the recipe and components required for producing the mixture. However, from time to time the batched amounts of each component (i.e., the amount of each component in the batch actually produced) differs from the amounts specified in the recipe received from master database module 11 due to statistical or control factors.

Figure 5:
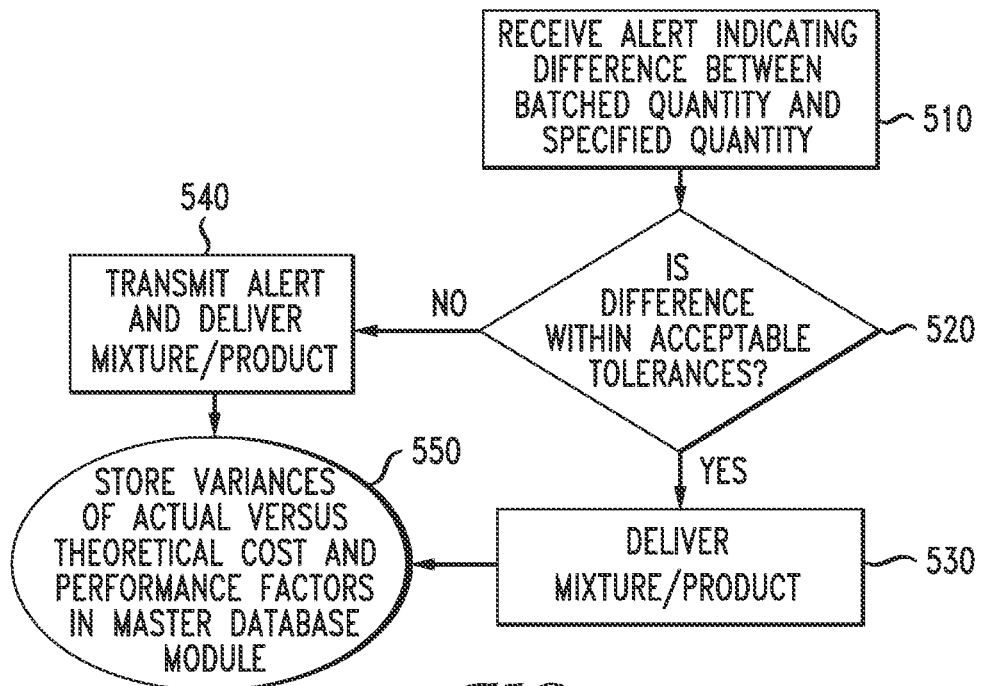
FIG. 5 is a flowchart of a method of responding to an alert indicating a difference between a batched quantity and a specified quantity in accordance with an embodiment.

When quantity variances are outside the specified tolerances, alerts are transmitted and the actual amounts produced, and cost variances from target costs provided to master database module 11. FIG. 5 is a flowchart of a method of responding to an alert indicating a difference between a batched quantity and a specified recipe quantity in accordance with an embodiment. At step 510, an alert is received indicating a difference between a batched quantity and a specified recipe quantity. The alert typically indicates variances of actual versus theoretical cost and performance factors. Referring to block 520, if the differences are within acceptable tolerances, the method proceeds to step 530 and the product is delivered. If the differences are not within acceptable tolerances, the method proceeds to step 540. At step 540, an alert is transmitted and the product is delivered. An alert may be transmitted to the customer, for example. At step 550, the variances of actual versus theoretical cost and performance factors are stored at master database module 11. In other embodiments variances are not stored.

After production, of the mixture, the production facility uses one or more transport vehicles to transport the product/mixture from the production facility to the customers site. Such transport vehicles may include trucks, automobiles, trains, airplanes ships, etc. Each transport vehicle is equipped with a transport module such as transport module 15. Transport module 15 transmits by communication line 24 to master database 11 information concerning the transport of the product/mixture. The information concerning the transport can include changes which are made to the mixture during transport (e.g., addition of water or other chemicals), the length of travel, temperatures during transport, or other events that occur during transport. For example, in the ready mix concrete industry it is common for a truck transporting, the mixture from the production facility to a delivery site to add water and/or chemicals during the transport process. Information indicating such addition of chemicals or water is transmitted to master database module 11 by communication line 24. Furthermore in the ready mix concrete industry, measuring and recording the temperature of the cote during transport is advantageous for several reasons: (a) such data can be used to determine a maturity value per ASTM c1074; (b) such data, in combination with reference heat of hydration data may be used to determine degree of hydration attained during transport; (c) the data, in combination with reference strength and heat of hydration data may be used to determine pre-placement strength loss due to pre-hydration prior to discharge of the concrete at project site.

Figure 6:
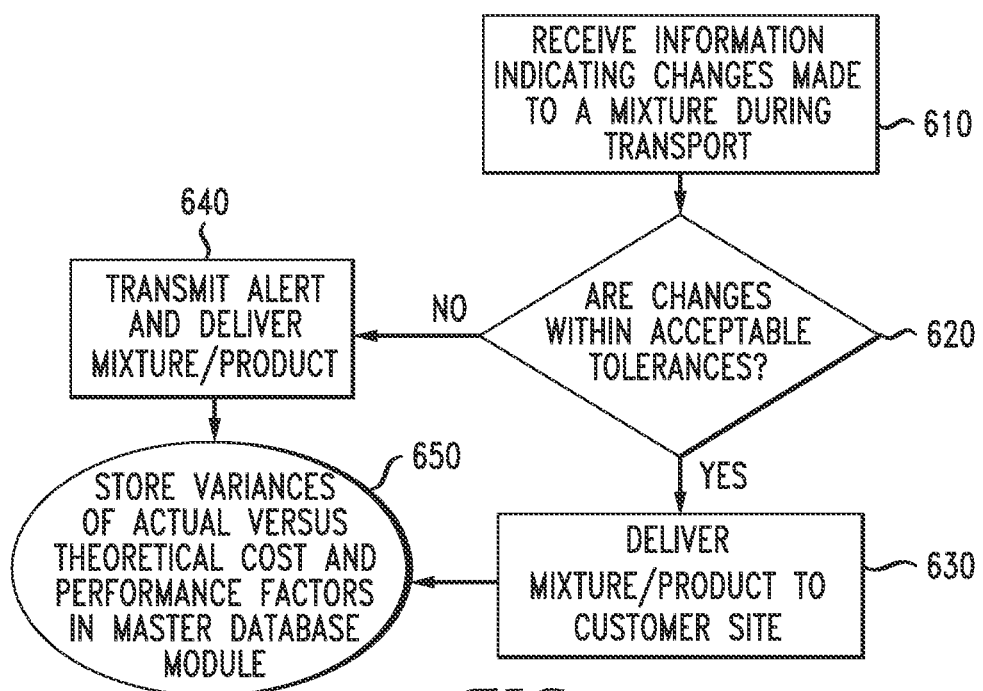
FIG. 6 is a flowchart of a method of managing transport-related data in accordance with an embodiment.

The transport-related information is transmitted by transport module 15 to master database module 11. For example, such information may be transmitted in the form of an alert. The information is analyzed by master database module 11 to determine whether the changes that are made are within acceptable tolerances. FIG. 6 is a flowchart of a method of managing transport-related data in accordance with an embodiment.

At site 610, information indicating changes to a mixture during transport is received from a transport module. For example, master database module 11 may receive an alert from transport module 15 indicating that changes occurred to a mixture during transport of the mixture. Referring to block 620, a determination is made whether the changes are within acceptable tolerances. If the changes are within acceptable tolerances, the method proceeds to step 630. At step 630, the product/mixture is delivered to the customer's site. If the changes are not within acceptable tolerances, the method proceeds to step 640. At step 640, an alert is transmitted to the customer and the product/mixture is delivered. Alerts to the customer may be issued by alert module 17, or by master database module 11. At step 650, the information concerning changes occurring during transport is saved at master database module 11. In other embodiments, information concerning changes is not stored.

In the illustrative embodiment, the customer's site or location is equipped with site module 16, which transmits to master database module 11, by communication line 25, information about the mixture of product that is delivered to the site. Such information may include, for example, information indicating the actual performance of the product/mixture as delivered. Master database module 11 stores the actual performance data. Master database module 11 may provide to the customer a report concerning various aspects of the actual product delivered.

Site module 16 may also receive alerts from alert module 17 by communication line 35.

In the illustrative embodiment, alert module 17 is a module separate from master database module 11. However, in other embodiments, the functions of alert module 17 may be performed by master database module 11.

Alert module 17 may also transmit final reports concerning the products to site module 16, thereby enabling the seller and the customer a way of managing the product. Feedback provided throughout the production process, as illustrated above, advantageously allows the customer and the manufacturer to manage costs and quality of the products.

The alert functions described above facilitate the process of managing production and costs. In response to any alert, the customer or the manufacturer has the ability to make a decision not to continue the production or delivery of the product because the product has fallen outside of acceptable tolerances.

While the illustrative embodiment of FIG. 1A includes only one production module, one transport module, one site module, one alert module, one purchase module, one input module, and one sales module, in other embodiments, a system may include a plurality of production modules, a plurality of transport modules, a plurality of site modules, a plurality of alert modules a plurality of purchase modules, a plurality of input modules, and/or a plurality of sales modules. For example, in an illustrative embodiment, suppose that a system used by a company in the ready mix concrete industry includes a master database module 11 residing and operating on a server computer located in Pittsburgh, Pa. The company's sales force may be located in Los Angeles, Calif., where the sales module 13 resides and operates (on a computer). Suppose that a sale is made in Los Angeles, and the purchase order specifies a site in San Francisco, Calif. Thus, master database module 11 may output an order to a production module 14 which is located at a ready mix production facility in the vicinity of San Francisco, Calif. Suppose further that a single production facility in the vicinity of San Francisco cannot handle the volume of the concrete that is needed for the job site in San Francisco. In such a case, master database module 11 may output to a plurality of production facilities, each having a production and module 14, the necessary orders for fulfillment. Thus, the system includes a plurality of production modules, one in each of the various production facilities. The production facilities produce the specified mixture and transport the ready mix concrete in a plurality of trucks to the customer site in San Francisco. Each truck has a transport module associated therewith. Suppose that one or more of the production modules does not have the specific components that were specified in the purchase order for the concrete. Thus, adjustments may be made at the production facility to the concrete mixes, and information concerning such adjustments are transmitted back to the master data base module 11. Such adjustment information may be processed in accordance with the steps illustrated in FIGS. 3 and/or 4.

During the transport of the ready mix concrete front the various production facilities, the transport modules 15 in each of the tracks transmit to the master database module 11 any charges made to the mixture. The master database module 11 may then perform the method described FIG. 6. In a similar manner, master database module 11 is informed of any changes occurring during production and, as a result, master database module 11 may perform the method described in FIG. 5.

Finally, the concrete is delivered to the customer site in San Francisco and information concerning the delivered concrete may be transmitted to the master database module 11. The site module 16 may also be used to provide the master database module 11 with information relating to one or more of the following: measurements of the actual heat of hydration taken from the fresh state through the hardening process, strength characteristics of the concrete after it is hardened, etc. Advantageously, the feedback provided in this manner to master database module 11 from the various modules enables the customer of the concrete in Los Angeles to monitor, on a real time basis, the concrete poured at the customer's construction site in San Francisco, without having to physically be in San Francisco.

Furthermore, the customer in Los Angeles may monitor, on a real time basis, costs associated with the concrete which is delivered to the site in San Francisco.

Furthermore, the ready mix concrete producer may associate, in real time, variances in one or more parameters relating to the concrete's performance from specified expectations, and correlate such variances to actual batched versus the expected specified recipe. These capabilities advantageously allow the maintenance of consistent, low standard deviation production batching from a mixture recipe baseline, and production of concrete that has a consistent strength performance with a low standard deviation.

Changes in materials may impact a producer's cost of materials (COM). An increase in COM can in turn impact the producer's profitability. In many instances, any increase (in percentage terms) in the COM results in as much greater impact on profitability (in percentage terms). For example, it has been observed that, using ACI 318 statistical quality criteria, it can be demonstrated that each 1% cement or water variance, from the mix design theoretical recipe value can result in a cost impact of around $0.2 to $0.4 per cubic yard. Since such variances can typically range from 2% to 10%, the cost impact may range from $0.4 to $10 per cubic yard annually. This cost impact is a very large percentage of the average profit of a producer in the ready mix concrete industry, which is on the order of $1/cubic yard.

Advantageously, the integrated production management system and method described herein enables a producer to manage the overall production system for ready mix concrete, and allows greater control over changes that may impact the producer's costs (and profits). The integrated production management system and method described herein also provides a customer increased control over the customer's construction site.

For convenience, several examples relating to the ready mix concrete industry are described below.

Concrete Construction & Manufacturing/Production Examples

Examples are provided for three different market segments:
A. Ready Mix Concrete
B. Contractors
C. State Authorities Closed Loop Solutions (CLS) Overview Set forth below is a discussion of a closed loop solution (CLS) in accordance embodiment. Each operation has a set of theoretical goals and obtained physical or actual results.

Practically all operational IT architectures include a collection of disparate information systems that need to work together.

CLS is an information technology solution that enforces: Data Integrity across linked or associated disparate information systems (Ready Mix Example: Mix costs & formulae to have data integrity or be the same across mix management, sales, dispatch, batch panels, and business systems) Closed Loop Data Integrity, meaning that the operations' goals and its actual physical results match within tolerances (concrete batch & mix BOMs (Bill of Materials) closely match)

Four Types of CLS for Different Market Segments

I. Ready Mix Producers: Closed Loop Integration (CLI):
  1) CLI has been implemented as a CLS application for many Ready Mix Producers in the U.S. and Canada.
  2) CLI applications are real-time, two-way interfaces with production systems
  3) One of the main purposes of CLI is to enforce data integrity between batches in trucks and parent mix designs; CLI closes the loop between the mix management and production cycles.

II. Ready Mix Producers: Closed Loop Sales Management (CLSM)
  1) CLSM is a CLS application for Ready Mix Producers in the US and Internationally.
  2) One of the main purposes of Closed Loop Sales Management is a project-based workflow for the industry sales process, tracking actual versus target profitability, This application closes the loop between actual and target profitability factors. One benefit is maximization of profitability.

III. Contractors: Closed Loop Quality & Cost
  1) The solution for the Contractor market segment is similar to the Closed Loop Quality application, except that it also includes concrete delivered cost management
  2) One of the main purposes of Closed Loop Quality & Cost is a real time enforcement of placed concrete obtained specs and performance to the applicable project specs, plus monitoring placed versus as-purchased cost—This application closes the loop between both the delivered versus specified project concrete performance, and cost.

IV. State Authorities: Closed Loop Quality
  1) This solution is intended for the Authorities market segment as a modification of the CLI production driven Ready Mix application
  2) One of the main purposes of Closed Loop Quality is a real time enforcement of placed concrete obtained specs and performance to the applicable project specs.

This application closes the loop between the delivered versus specified project concrete performance.

Set forth below are several application examples.

[A] Ready Mix Concrete Producers—CLS Type: Closed Loop Integration for Real Time, Production Level, Consolidated Mix Management I. Ready Mix Needs Include:
1) Consolidate critical mix, cost, and quality data in a single database
2) Minimize quality issues
3) Utilize materials efficiently
4) Real time information visibility—customized by user profile II. Ready Mix Economics & its Management:
1) 50% to 70% of cost of business (COB) is cost of materials (COM)
2) A 1% increase in COM can translate to more than a 10% profitability drop
3) Thus, production level materials management is important to profitability. Table 1 shows the relationship between COM and profitability.

TABLE 1

| Item | per Cyd |
|---|---|
| Net Profit % | 5.0% |
| Price | $85.00 |
| Cost of Business (COB) | $80.75 |
| Net Profit | $4.25 |
| Cost of materials (COM) as % of COB | 55.0% |
| COM | $44.41 |
| 1% increase in COM | $0.44 |
| Change in COB | $0.44 |
| Change in Net profit | ($0.44) |
| % change in net profits per % COM | −10.5% |

III. To meet quality, materials utilization, and information visibility needs:
1) Optimize mixes to performance and cost goals in a consolidated database using mix optimization tools.
2) Implement closed loop integration (CLI) for the production level management of optimized mixes; may use alerts application for alert notification of out-of-tolerance batches.
3) Use CLI to ship concrete to mix baselines for implementing production level, real time cost and quality management. The CLI system in effect uses mixes as a budgetary tool for both quality and cost control.

[B] Contractors—CLS Type: Closed Loop Cost & Quality

Figure 6A:
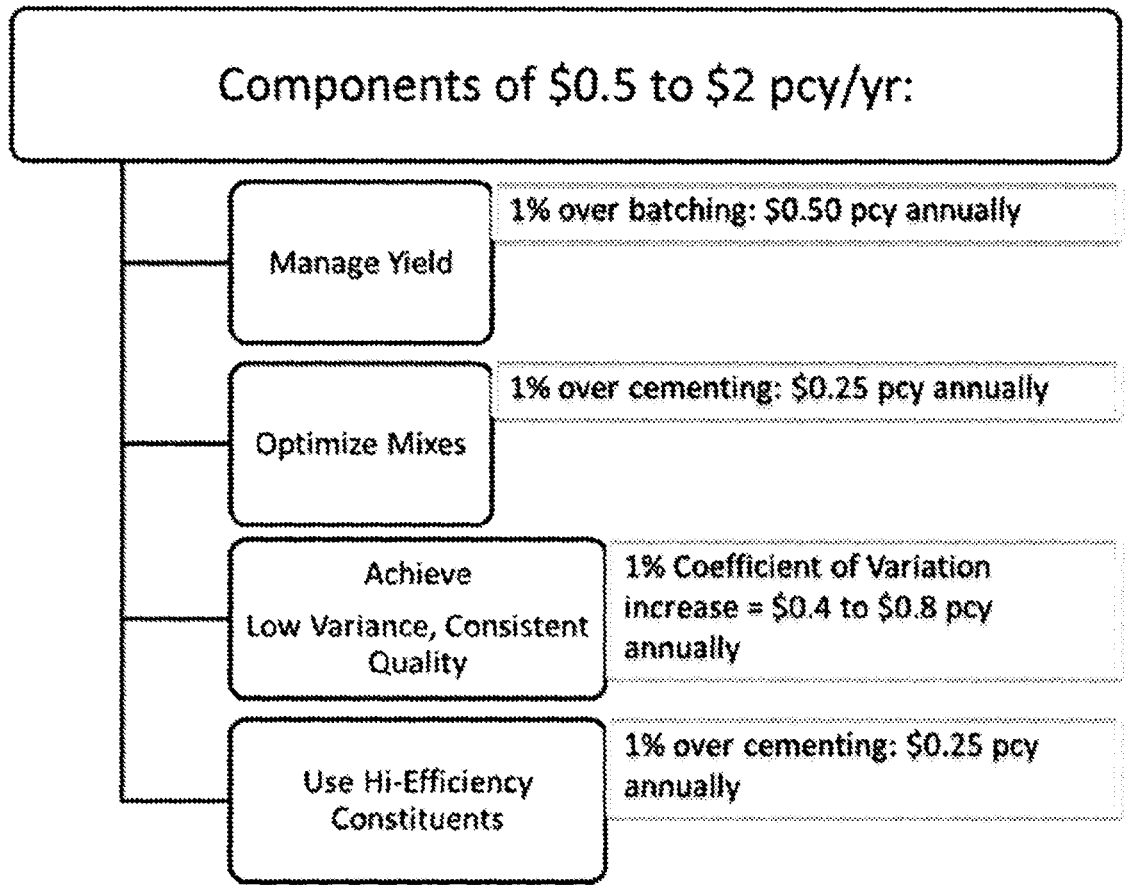
FIG. 6A displays a table showing advantages of real time, consolidated costs and quality management in accordance with an embodiment.

FIG. 6A displays a table showing advantages of real time, consolidated costs and quality management in accordance with an embodiment.

I. Contractor Concrete Related Needs:
1) Consolidate aspects of concrete related data across all projects in a single database.
2) Ensure obtained quality meets specifications in order to minimize quality issues and avoid project delays
3) Track & match up contracted volume & cost versus actual delivered volumes & costs
4) Real time information visibility—customized by user profile II. Basic Contractor Economics:
1) Concrete cost and quality related schedule delay can amount to around 16% in profit loss.
2) Thus, production level concrete quality and cost management are important to contractor profitability III. Closed Loop Solution to meet quality, cost management, and information visibility needs:
1) Implement Closed Loop Cost & Quality (CLCQ) for the real time management of obtained versus a) specified performance and recipe factors, b) Actual versus budgeted cost and volume factors; use an alert system for alert reporting & notification of out-of-tolerance monitored variables.
2) For each project, consolidate quality & engineering team, tests, concrete deliveries & poured volumes, cost, project mix designs and specs, project documents, in a single unified database; do this across all of the contractor's projects in one or more countries—makes possible sharing and learning cross project experience
3) Use CLCQ to maintain quality, enforce meeting specs in real time, enforce budgetary cost & volume goals, and create real time, production level visibility including alerting reports.

Contractor Concrete Economics
1. 10% to 20% of a project cost is concrete cost; in some regions/countries this number may be close to 20%
2. Since contractor margin is on the order of 1% to 5%, a 1% change in concrete cost may result on average in about a 8% profitability drop
3. Additionally, it is import to avoid schedule slippage the to quality issues:
   1. Each delay day may represent roughly 0.2% to 1% of total project cost assume 0.2%
   2. Each delay day due to concrete quality for a $100 mil project may cost $200,000, or roughly an 8% drop in profitability
4. Concrete cost and quality schedule delay may total to around 16% in profit loss
5. Thus, production level quality and cost management are important to contractor profitability, and the related cost factors can be managed by a closed loop production system

[C] State Authorities—CLS Type: Closed Loop Quality For Real Time Consolidated Concrete Quality Management I. State Authority Key Concrete Related Needs
1) Consolidate all aspects of concrete related data across all projects in a single database including mix specifications and designs, batch data, and test data, as well as the required QC/QA plan
2) Make possible data access, input, and sharing cross projects, and by project-based entities
3) Ensure obtained quality and performance meet specifications in order to minimize quality issues and avoid project delays
4) Track & match up contracted costs & volumes versus actual values
5) Real time information visibility—customized by project & user profile II. State Authority Economics—Costs of Poor Quality and Reduced Longevity
1) Assume: $100 mil structure; 30,000 m3 concrete @ $100/m3 delivered
2) Concrete quality related schedule delay costs may amount to $70,000/delay day
3) Poor quality future repair costs may amount to $120,000 per 1% increase in strength CV
4) If the building service life is reduced by cue year due to poor quality, then a revenue loss of around $1.25 mil, may result
5) Thus, production level, real time quality and cost management is important to the owner economics 6) These significant cost factors may be managed by the closed loop system III. To Meet Quality, Cost Management, and Information Visibility Needs
1) For each project, consolidate concrete production volumes, project mix designs and specifications, and tests in a single database. Also include the QA/QC plan
2) Make possible data access, input, and sharing across projects. Restrict access by project and user profile. Include: State officials, Engineers/Architects, Contractors Test Labs, and Ready Mix Producers
3) Implement Closed Loop Quality (CLQ) for the real time management of obtained versus specified performance and recipe factors; use an alert system for alert notification of out-of-tolerance batches. Reconcile tests against QC/QA plan.
4) Create real time, production level visibility including alerting reports.

State Authority Concrete Economics
Assume a $100 Mil Structure Requiring 30,000 m3 Concrete @ an Average of $100/m3 Delivered
1. Suppose that:
   1) The owner wishes to amortize the $100 mil cost during a 10-year period, which amounts to a monthly rate of $833,333, and wishes to lease the building for the same amount
   2) The owner takes a 30 year mortgage @ 5% interest amounting to a monthly payment of $535 k.
   3) This leaves a monthly cash flow of around $300 k, or $3.6 mil/yr
2. Poor Quality Cost Factors include:
   1) Each delay day may result in an opportunity cost of roughly $70,000, or around 2% of annual cash flow
   2) If poor quality goes unnoticed, and is repaired at a later date, each 1% increase in the 28-day strength coefficient of variation from its ACI 318 design base may result in future repair costs of $120 k, or around 7% of the annual cash flow
   3) If poor quality goes unnoticed, and is not treated, each one year reduction the service life may amount to $3.6 in lost revenues. Annualized over the first 10 years, this changes the monthly cash flow to around a loss of ($60,000)
3. Concrete poor quality costs without a reduction in the service life can amount to around 9% of cash flow; with service life reduction, the cash flow can turn negative.
4. Thus, production level quality management is important to the owner economics, and related cost factors can be managed by the closed loop system In accordance with another embodiment, a mixture formulation is maintained by master database module 11. Localized versions of the mixture formulation intended for use at respective production facilities are generated, stored, and provided to the respective production facilities, as necessary. At a respective production facility, the mixture is produced based on the localized version of the mixture formulation.

Figure 7A:
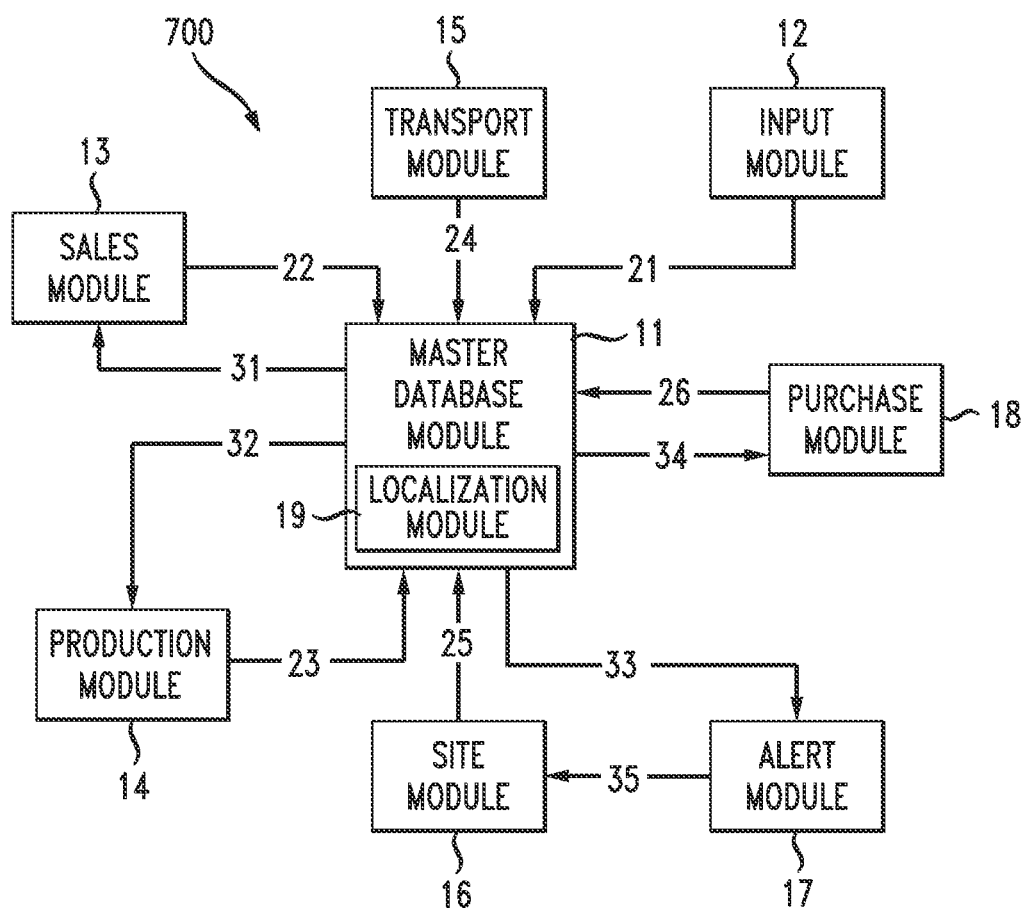
FIG. 7A shows a production management system in accordance with another embodiment.

FIG. 7A shows a production management system 700 in accordance with another embodiment. Similar to product management system 10 of FIG. 1A, product management system 700 includes a master database module 11, an input module 12, a sales module 13, a production module 14, a transport module 15, a site module 16, an alert module 17, and a purchase module 18.

A localization module 19 resides and operates in master database module 11. For example, master database module 11 and localization module 19 may comprise software that resides and operates on a computer.

Localization module 19 generates one or more localized versions of a mixture/formulation for use at respective production facilities where a mixture may be produced. Localization module 19 may, for example, access a mixture formulation maintained at master database module 11, analyze one or more local parameters pertaining to a selected production facility, and generate a modified version of the mixture formulation for use at the selected production facility. Localization module 19 may generate localized versions of a particular mixture formulation for one production facility or for a plurality of production facilities. For example, master database module 11 may generate localized versions of a mixture formulation for every production facility owned or managed by a producer. Likewise, localization module 19 may generate localized versions of selected mixture formulations maintained by master database module 11, or may generate localized versions for all mixture formulations maintained by master database module 11.

Figure 7B:
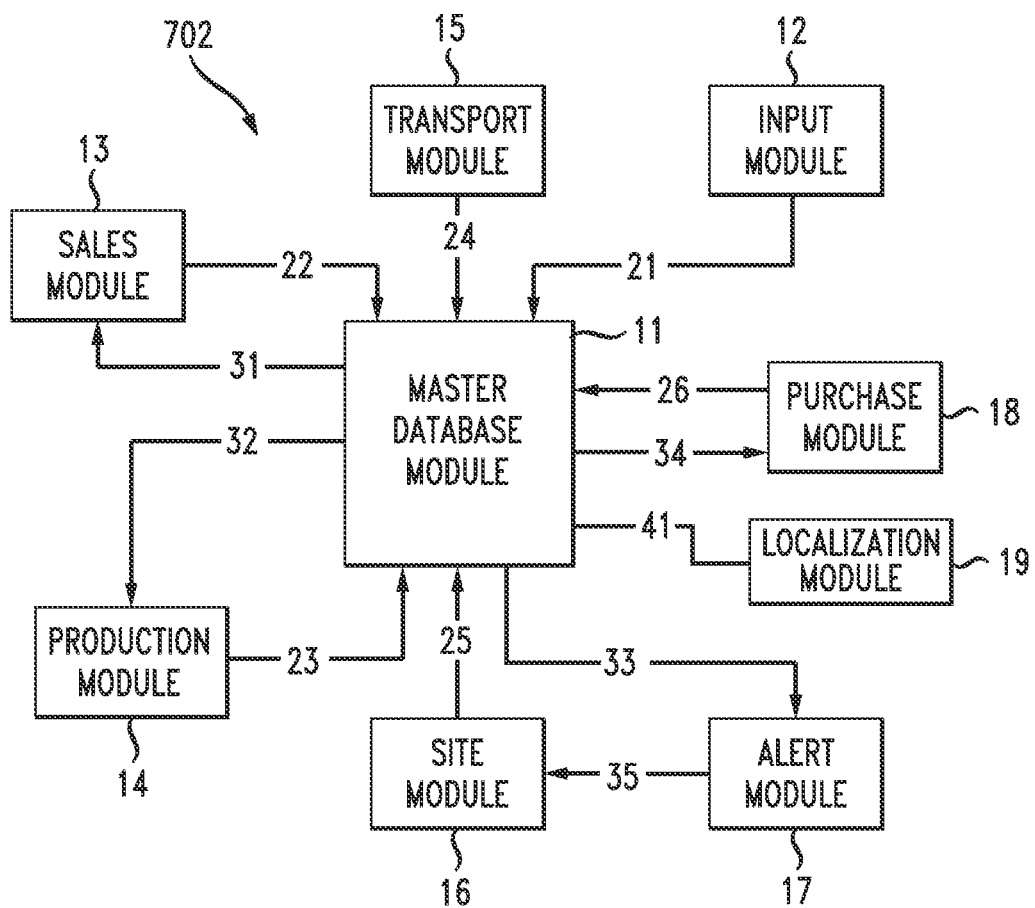
FIG. 7B shows a production management system in accordance with another embodiment.

FIG. 7B shows a production management system 702 in accordance with another embodiment. Similar to product management system 10 of FIG. 1A, product management system 702 includes a master database module 11, an input module 12, a sales module 13, a production module 14, a transport module 15, a site module 16, an alert module 17, and a purchase module 18. In the embodiment of FIG. 7B, localization module 19 is separate from master database module 11 and is connected to master database module 11 by a link 41. For example, master database module 11 may reside and operate on a first computer and localization module 19 may reside and operate on a second computer remote from master database module 11. For example, localization module 19 may reside and operate on a second computer located at a production facility. Localization module 19 may communicate with master database module 11 via a network such as the Internet, or via another type of network, or may communicate via a direct communication link.

Figure 7C:
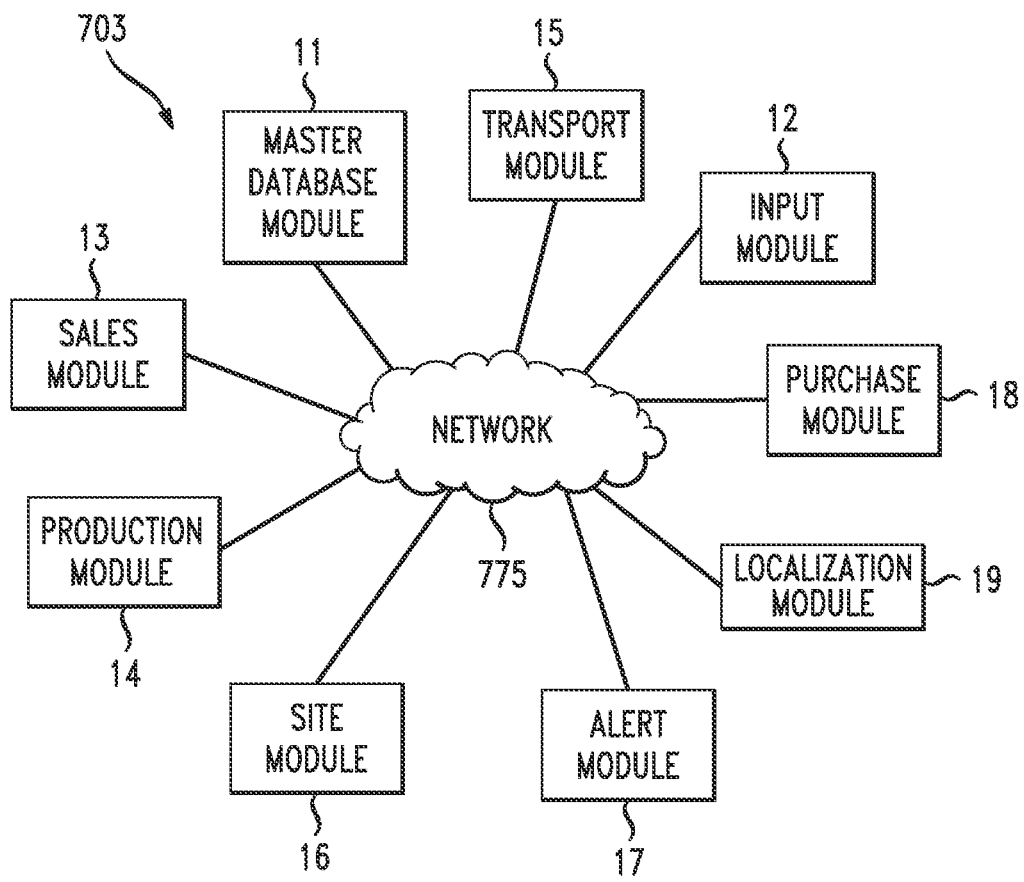
FIG. 7C shows a production management system in accordance with another embodiment.

FIG. 7C shows a production management system 703 in accordance with another embodiment. Product management system 703 includes a master database module 11, an input module 12, a sales module 13, a production module 14, a transport module 15, a site module 16, an alert module 17, a purchase module 18, and a localization module 19. Modules 11-19 are connected to a network 775. Modules 11-19 communicate with each other via network 775. For example, various modules may transmit information to master database 11 via network 775.

Network 775 may comprise the Internet, for example. In other embodiments, network 775 may comprise one or more of a number of different types of networks, such as, for example, an Intranet, a local area network (LAN), a wide area network (WAN), a wireless network, a Fibre Channel-based storage area network (SAN), or Ethernet. Other networks may be used. Alternatively, network 775 may comprise a combination of different types of networks.

Figure 8:
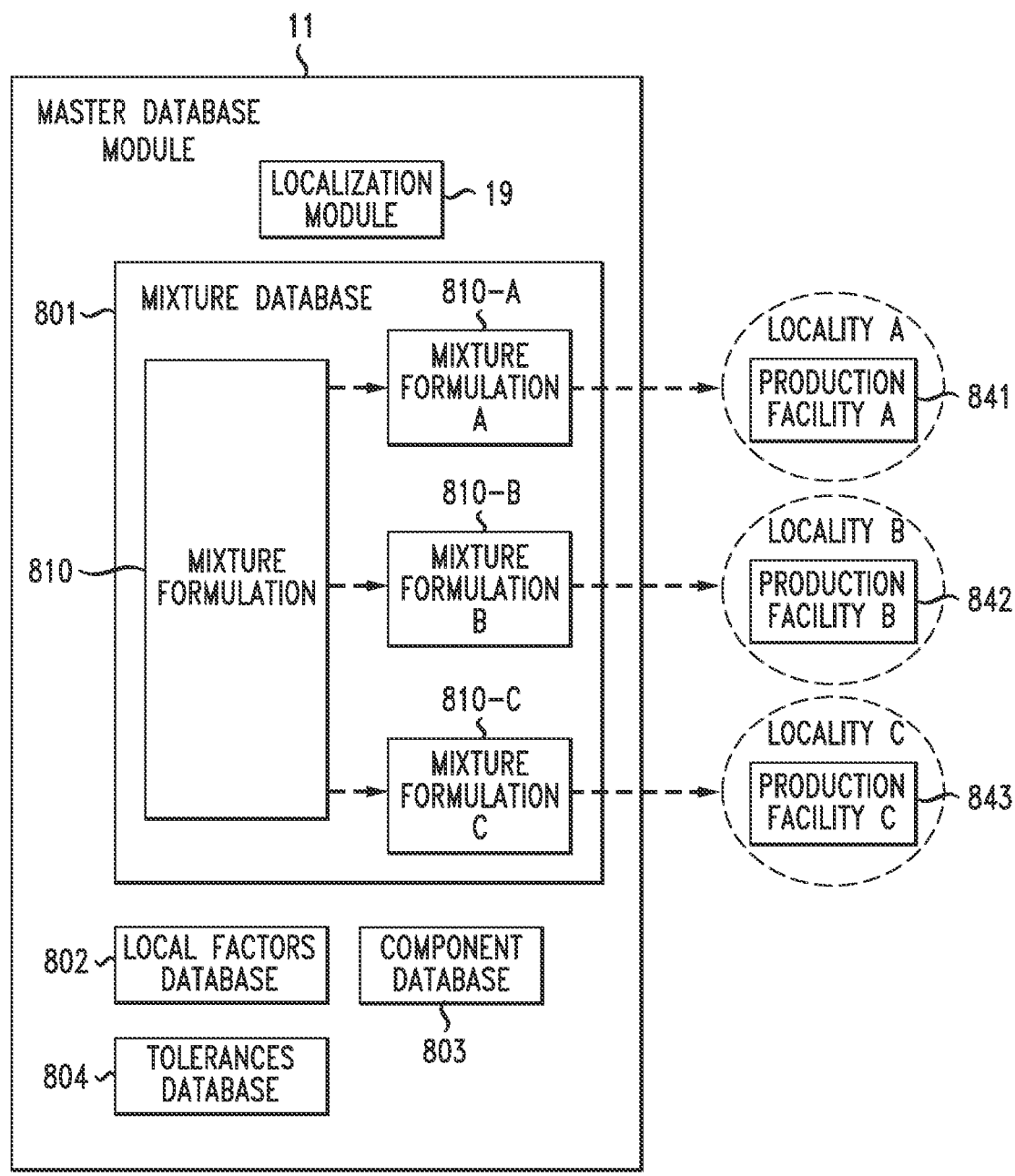
FIG. 8 illustrates a system for the management of localized versions of a mixture formulation in accordance with an embodiment.

FIG. 8 illustrates a system for the management of localized versions of mixture formulation in accordance with an embodiment. In the illustrative embodiment of FIG. 8, master database module 11 comprises localization module 19, a mixture database 801 and a local factors database 802. A mixture formulation 810 associated with a particular mixture is maintained in mixture database 801. While only one mixture formulation is shown in FIG. 8, it is to be understood that more than one mixture formulation (each associated with a respective mixture) may be stored by master database module 11.

Master database module 11 is linked to several production facilities, as shown in FIG. 8. In the illustrative embodiment, master database module 11 is in communication, with Production Facility A (841), located in Locality A, Production Facility B (842) located in Locality B, and Production Facility C (843), located in Locality C. While three production facilities (and three localities) are shown in FIG. 8, in other embodiments more or fewer than three production facilities (and more or fewer than three localities) may be used.

In the embodiment of FIG. 8, local factors database 802 stores local factor data relating to various production facilities, including, for example, local availability information, local cost information, local market condition information, etc. Localization module 19 may obtain local factor data based on the information in local factors database 802.

In the illustrative embodiment, localization module 19 accesses mixture formulation 810 and generates a localized version for Production Facility A (841), shown in FIG. 8 as Mixture Formulation A (810-A). Localization module 19 generates a localized version for Production Facility B (842), shown in FIG. 8 as Mixture Formulation B (810-B). Localization module 19 also generates a localized version for Production Facility C (843), shown in FIG. 8 as Mixture Formulation C (810-C). Mixture Formulation A (810-A), Mixture Formulation B (810-B), and Mixture Formulation C (810-C) are stored at master database module 11.

In order to generate a localized version of a mixture formulation for a particular production facility, localization module 19 accesses local factors database 802 and analyzes one or more local factors pertaining to the particular production facility. For example, localization module 19 may analyze one or mom local availability factors representing local availability of components in the mixture formulation, one or more local market condition factors representing characteristics of the local market, one or more local cost factors representing the cost of obtaining various components in the local market, etc.

Localization module 19 may modify a mixture formulation based on a local factor. For example, if a local market factor indicates a strong preference for a product having a particular feature (or a strong bias against a certain feature), localization module 19 may alter the mixture formulation based on such local market conditions. If a particular component is not available in a local market, localization module 19 may alter the mixture formulation by substituting an equivalent component that is locally available. Similarly, if a particular component is prohibitively expensive in a particular locality, localization module 19 may reduce the amount of such component in the mixture formulation and/or replace the component with a substitute, equivalent component.

It is to be understood that FIG. 8 is illustrative. In other embodiments, master database module 11 may include components different from those shown in FIG. 8. Mixtures and local factors may be stored in a different manner than that shown in FIG. 8.

Figure 9:
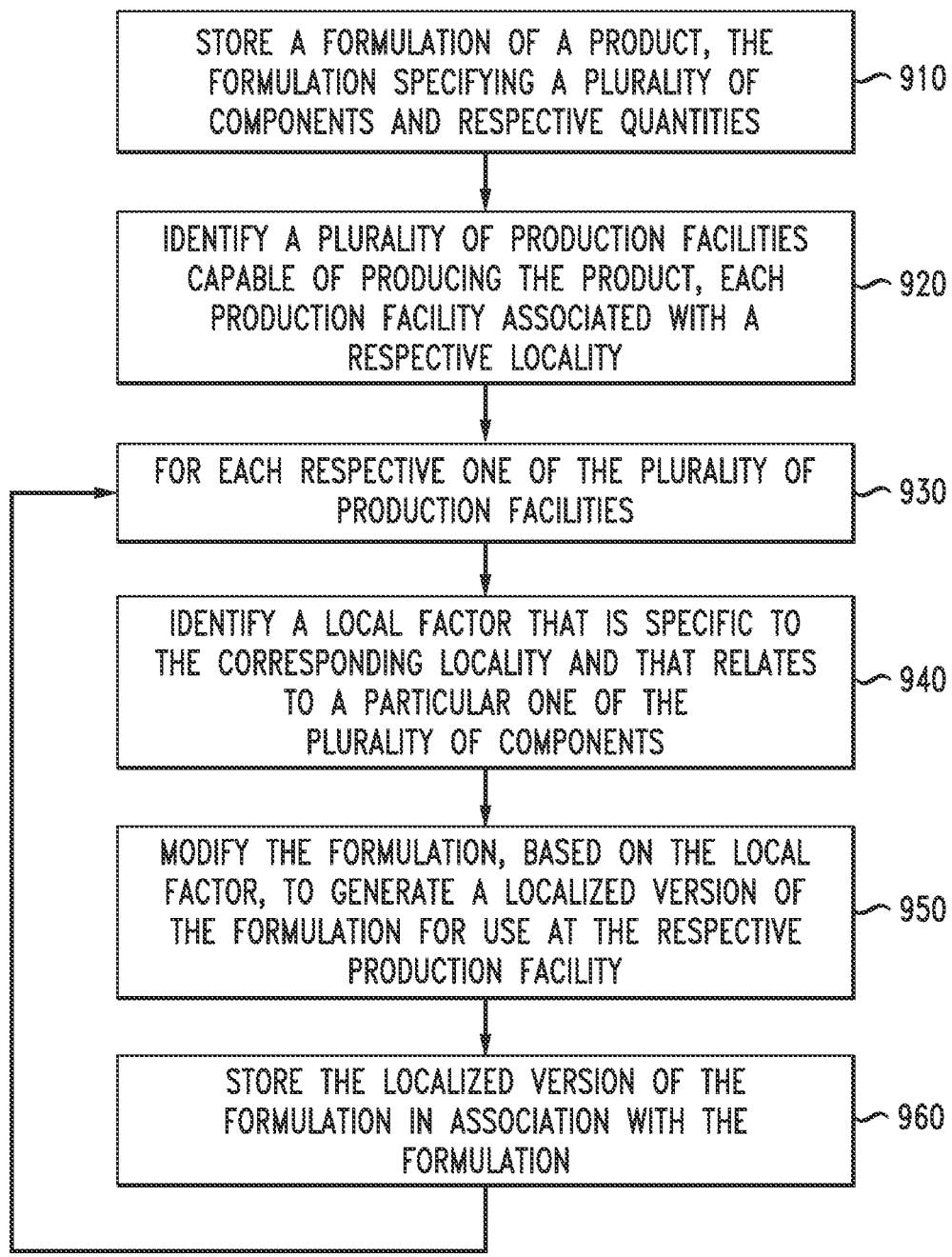
FIG. 9 is a flowchart of a method of generating localized versions of a mixture formulation in accordance with an embodiment.

FIG. 9 is a flowchart of a method of generating localized versions of a mixture formulation in accordance with an embodiment. The method presented in FIG. 9 is discussed with reference to FIG. 10. FIG. 10 shows mixture formulation 810 and several corresponding localized versions of the mixture formulation in accordance with an embodiment.

At step 910, a formulation of a product is stored, the formulation specifying a plurality of components and respective quantities. As discussed above, mixture for 810 is stored at master database module 11. Referring to FIG. 10; mixture formulation 810 specifies the following components and quantities: C-1, Q-1; C-2, Q-2; C-3, Q-3; C-4 Q-4; and C-5. Thus, for example, mixture formulation 810 requires quantity Q-1 of component C-1, quantity Q-2 of component C-2, etc. Mixture formulation 810 may also specify other information, including method to be used to manufacture the mixture.

At step 920, a plurality of production facilities capable of producing the product are identified, each production facility being associated with a respective locality, in the illustrative embodiment, localization module 19 identifies Production Facility A (841) in Locality A, Production Facility B (842) in Locality B, and Production Facility C (843) in Locality C.

Referring to block 930, for each respective one of the identified production facilities, a series of steps is performed. At step 940, a local factor that is specific to the corresponding locality and that relates to a particular one of the plurality of components is identified. Localization module 19 first accesses local factors database 802 and examines local factors relating to Locality A and Production Facility A (841). Suppose, for example, that localization module 19 determines that in Locality A, component C-1 is not readily available:

At step 950, the formulation is modified, based a the local factor, to generate a localized version of the for use at the respective production facility. In the illustrative embodiment of FIG. 10, localization module 19 substitutes an equivalent component SUB-1 for component C-1 to generate a localized version 810-A of mixture 810. Localized version 810-A is intended for use at Production Facility A (841).

At step 960, the localized version of the formulation is stored in association with the formulation. In the illustrative embodiment localized version 810-A is stored at master database module 11 in association with mixture formulation 810.

Referring to FIG. 9, the routine may return to step 930 and repeat steps 930, 940, 950, and 960 for another production facility, as necessary. Suppose, for example that localization module 19 determines that in Locality B (associated with Production Facility B (842)), local purchasers prefer a product with less of component C-2. Localization module 19 thus reduces the quantity of component C-2 in the respective localized version 810-B of mixture 810, as shown in FIG. 10. In particular, the amount of component C-2 in localized version 810-B is $(0.5)*(Q-2)$. Localized version 810-B is intended for use at Production Facility B (842). Localized version 810-B is stored at master database module 11 in association with mixture formulation 810, as shown in FIG. 8.

Suppose that localization module 19 also determines that in Locality C (associated with Production Facility C (843)), local purchasers prefer a product with an additional component C-6. Localization module 19 further determines that component C-6 is an equivalent of component C-5, but of lower quality. To accommodate local market conditions, localization module 19 reduces the quantity of component C-5 to $(0.7)*(C-5)$ and also adds a quantity Q-6 of component C-6 to generate a localized version 810-C of mixture 810, as shown in FIG. 10. Localized version 810-C is intended for use at Production Facility C (843). Localized version 810-C is stored at master database module 11 in association with mixture formulation 810, as shown in FIG. 8.

Master database module 11 may subsequently transmit one or more of the localized versions 810-A, 810-B, 810-C to Production Facilities A, B, and/or C, as necessary. For example, suppose that an order is received for Mixture Formulation 810. Suppose further that Production Facility A and Production Facility B are selected to produce the mixture. Master database module 11 accordingly transmits the localized version Mixture Formulation A (810-A) to Production Facility A (841). Mixture Formulation A (810-A) is stored at Production Module 14. Master database module 11 also transmits the localized version Mixture Formulation B (810-B) to Production Facility B (842). Mixture Formulation B (810-B) is stored at a respective production module (not shown) operating at Production Facility B (842).

The mixture is then produced at each designated production facility based on the respective localized version of the mixture formulation. In the illustrative embodiment, the mixture is produced at Production Facility A (841) in accordance with the localized version Mixture Formulation A (810-A)). The mixture is produced at Production Facility B (842) in accordance with the localized version Mixture Formulation B (810-B).

In accordance with another embodiment, master database module 11 from time to time updates the master version of a mixture formulation (stored at master database module 11). Master database module 11 also monitors versions of the mixture formulation maintained at various production facilities. If it is determined that a version of the mixture formulation stored at a particular production facility is not the same as the master version of the mixture formulation, an alert is issued and the local version is synchronized with the master version. For purposes of the discussion set forth below, any version of a mixture formulation that is stored at roaster database module 11 may be considered a "master version" of the mixture formulation.

Figure 11A:
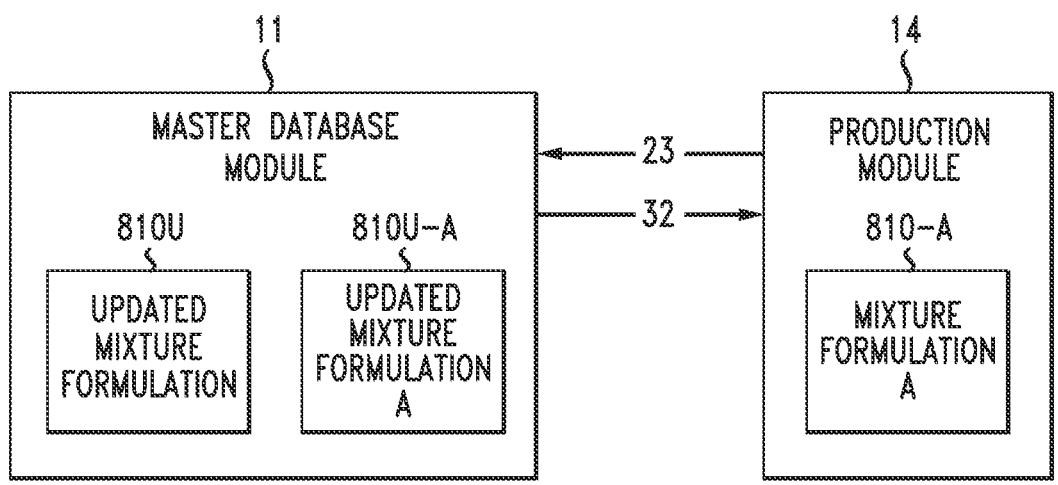
FIGS. 11A-11B illustrate a system for synchronizing versions of a mixture formulation in accordance with an embodiment.

In an illustrative embodiment, suppose that master database module 11 updates Mixture Formulation 810. This may occur for any of a variety of reasons. For example, the cost of one of the components in Mixture Formulation 810 may increase substantially, and the particular component may be replaced by an equivalent component. Referring to FIG. 11A, the updated formulation is stored at master database module 11 as Updated Mixture Formulation 810U.

Master database module 11 also generates localized versions of the updated mixture formulation. Thus, for example, master database module 11 generates an updated localized version of Mixture Formulation 810U for Production Facility 841 (in Locality A). The updated localized version of is stored at master database module 11 as Updated Mixture Formulation A (810U-A), as shown in FIG. 11A.

Figure 12:
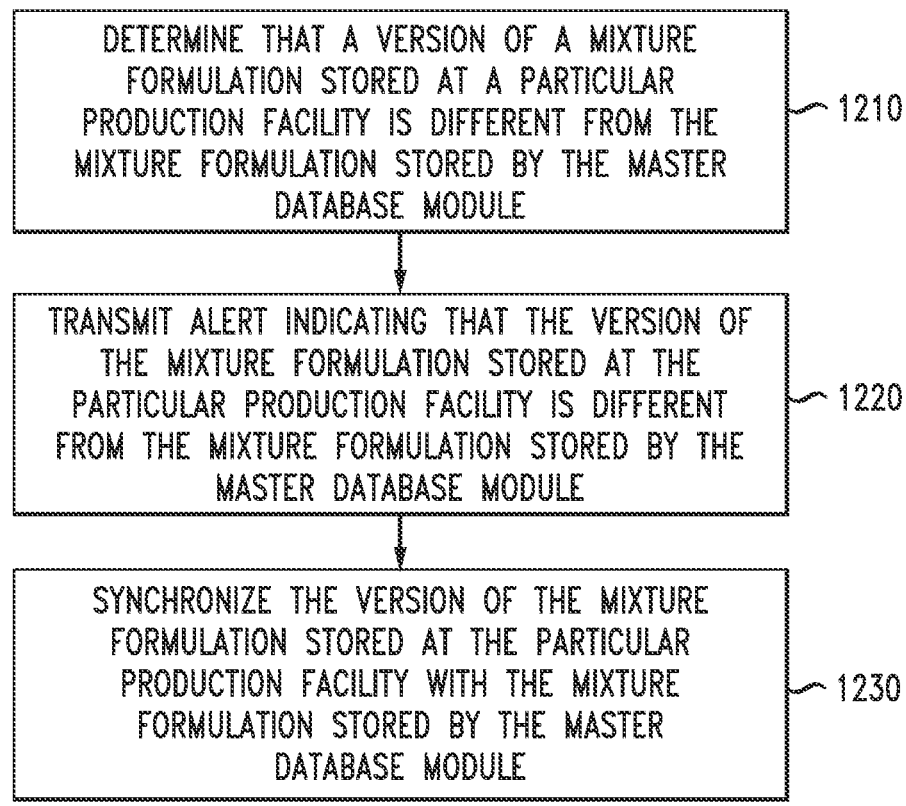
FIG. 12 is a flowchart of a method of synchronizing a localized version of a mixture formulation with a master version of the mixture formulation in accordance with an embodiment.

Master database module 11 identifies one or more production facilities that store a localized version of Mixture Formulation 810, and notifies each such production module that Mixture Formulation 810 has been updated. If a production module does not have the correct updated version of the mixture formulation, the localized version mast be synchronized with the updated master version stored at master database module 11. FIG. 12 is a flowchart of a method of synchronizing a localized version of a mixture formulation with a master version of the mixture formulation in accordance with an embodiment.

In the illustrative embodiment, certain aspects of production at Production Facility A (841) are managed by production module 14. For example, production module 14 may operate on a computer or other processing device located on the premises of Production Facility A (841).

At step 1210, a determination is made that a mixture formulation stored at a particular production facility is different from the mixture formulation stored by the master database module. For example, master database module may communicate to production module 14 (operating Production Facility A (841)) that Mixture Formulation A (810-A) has been updated. Production module 14 determines that its current localized version of the mixture formulation is not the same as updated Mixture Formulation A (810U-A).

At step 1220, an alert is transmitted indicating that the version of the mixture formulation stored at the particular production facility is different from the mixture formulation stored by master database module 11. Accordingly, production module 14 transmits an alert to master database module 11 indicating that its local version of the mixture formulation is not the same as the updated version stored at master database module 11.

Figure 11B:
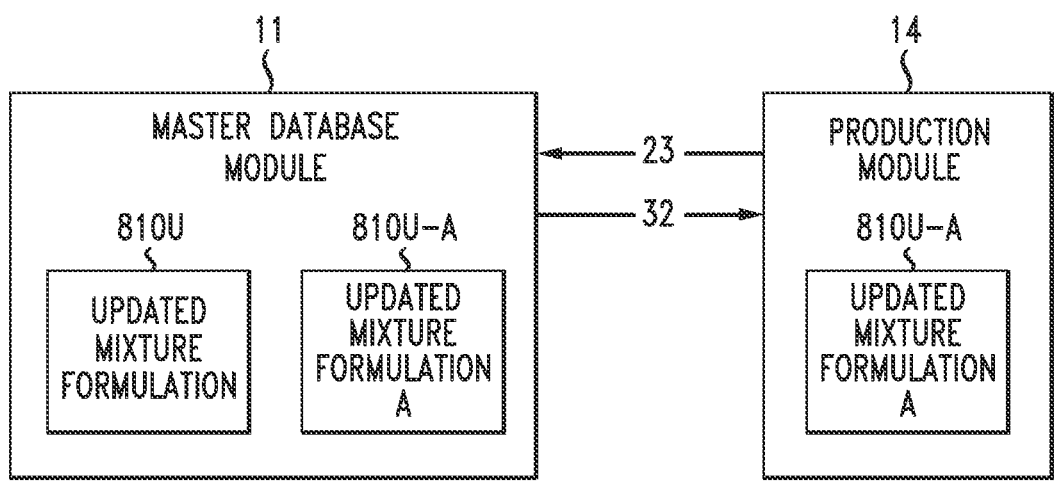

At step 1230, the version of the mixture formulation stored at the particular production facility is synchronized with the mixture formulation stored at the master database module 11. In response to the alert, master database module 11 provides production module 14 with a copy of Updated Mixture Formulation A (810U-A). Production module 14 stores Updated Mixture Formulation A (810U-A), as shown in FIG. 11B.

Various methods and system described above may be used in an integrated closed-loop production system to manage a production system. In accordance with an embodiment, a method of managing a closed-loop production system is provided. Master database module 11 provides to sales module 13 descriptions, prices, and other information relating to a plurality of available mixtures, enabling sales module 13 to offer several options to potential customers. Specifically, master database module 11 provides information relating to a plurality of concrete mixtures. Sales nodule 13 may present the information to a customer in the form of a menu, as discussed above with reference to FIG. 1B.

Suppose now that a customer considers the available mixtures and selects one of the plurality of concrete mixtures. Suppose further that the customer submits an order for the selected mixture, specifying parameters such as quantity, date and place of delivery, etc. For illustrative purposes, suppose that the customer selects the mixture associated with mixture formulation 810 (shown in FIG. 8) and specifies a delivery site located in or near Locality A (also shown in FIG. 8). Master database module 11 utilizes a closed-loop production system such as that illustrated in FIG. 1A to manage the sale, production and delivery of the selected mixture to the customer.

Figure 13A:
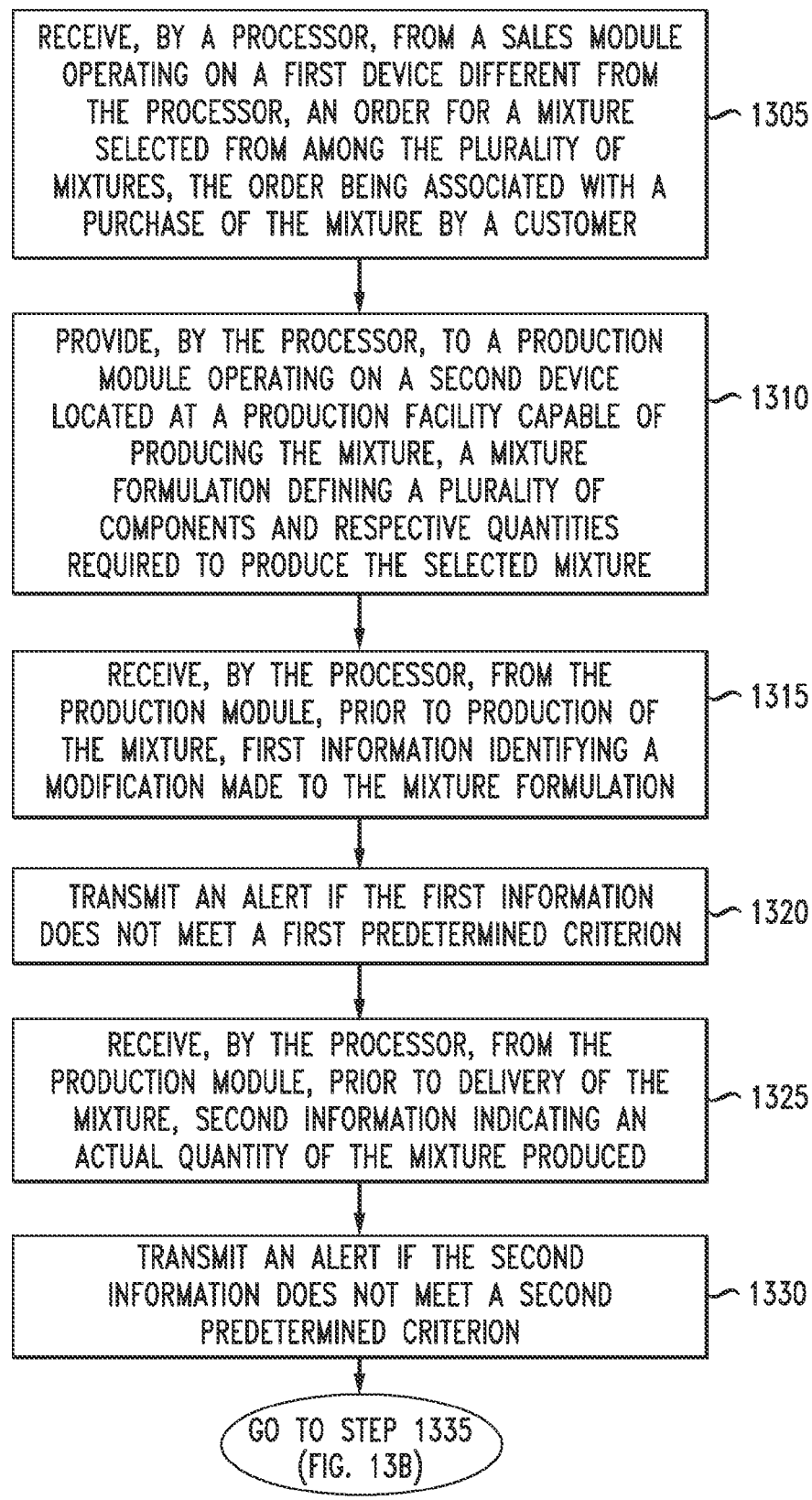
FIGS. 13A-13B comprise a flowchart of a method of managing a closed-loop production system in accordance with an embodiment.
Figure 13B:
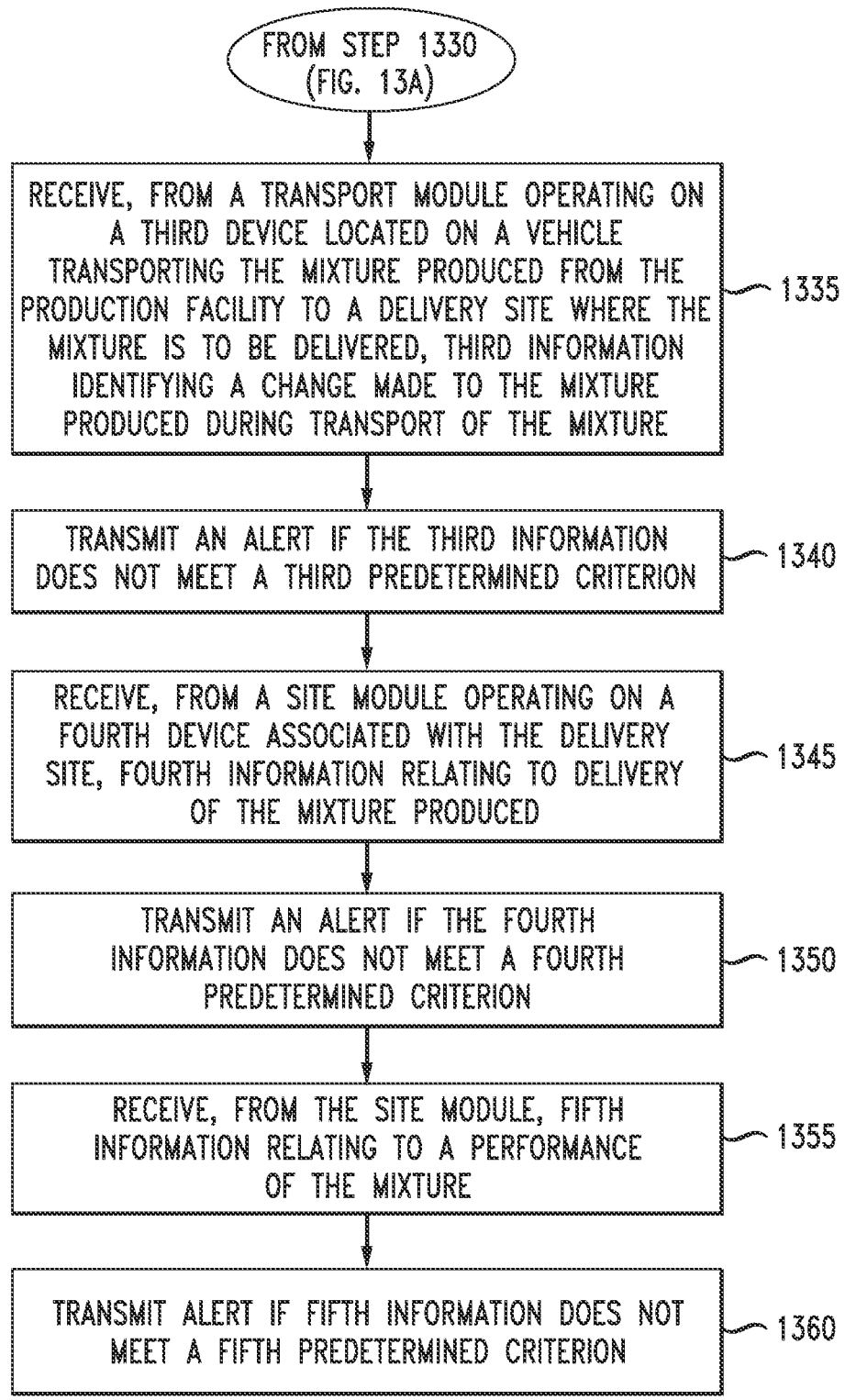

FIGS. 13A-13B comprise a flowchart of a method of managing a closed-loop production system in accordance with an embodiment. At step 1310, an order for a mixture selected from are the plurality of mixtures is received, by a processor, from a sales module operating on a first device different from the processor, the order being associated with a purchase of the mixture by a customer. In the illustrative embodiment, sales module 13 transmits the order for the selected concrete mixture to master database module 11. The order specifies the selected mixture and other information including quantity, date and place of delivery, etc. Master database module 11 receives the order for the selected concrete mixture from sales module 13.

At step 1310, a mixture formulation defining a plurality of components and respective quantities required to produce the selected mixture is provided, by the processor, to a production module operating on a second device located at a production facility capable of producing the mixture.

Accordingly, master database module 11 identifies one or more production facilities capable of producing the selected mixture. Production facilities may be selected based on a variety of factors. For example, master database module 11 may select one or more production facilities that are located near the delivery site specified in the order. In the illustrative embodiment, master database module 11 selects Production Facility A (841) due to the fact that the customer's delivery site is located in or near Locality A, it is to be understood that more than one production facility may be selected and used to produce a mixture to meet a particular order.

Master database module 11 transmits Mixture formulation A (810-A) (or any updated version thereof) to Production Facility A (841). Production module 14 manages and monitors the production process. In the illustrative embodiment, production module 14 determines that a particular component of mixture formulation A (810-A) is currently unavailable and replaces the component with a known equivalent. Production module 14 accordingly transmits an alert to master database module 11 indicating that the component has been replaced. An alert may then be provided to the customer, as well. Production of the selected mixture proceeds. In one embodiment, the alert may be transmitted in real time (e.g., within a specified time period after production module 14 receives the information).

At step 1315, first information identifying a modification made to the mixture formulation is received, by the processor, from the production module, prior to production of the mixture. Master database module 11 receives the alert from production module 14.

At step 1320, an alert is transmitted if the first information does not meet a first predetermined criterion. If the modification does not meet specified requirements, master database module 11 transmits an alert to the customer. In one embodiment, the alert is transmitted in real time.

In the illustrative embodiment, a quantity of the mixture actually produced at Production Facility A (841) differs from the quantity specified in the order. Production module 14 transmits an alert to master database module 11 and to alert module 17 indicating that the quantity actually produced differs from the quantity ordered. The alert may be transmitted in real time. At step 1325, second information indicating an actual quantity of the mixture produced is received, from the production module, prior to delivery of the mixture. Master database module 11 receives the alert and stores the information specifying the actual quantity produced.

At step 1330, an alert is transmitted if the second information does not meet a second predetermined criterion. If the quantity of concrete mixture actually produced does not meet specified requirements, master database module 11 transmits an alert to the customer. In one embodiment, the alert is transmitted in real time.

In another embodiment, production module 14 may inform master database module 11 if the method of manufacture specified in the mixture formulation is changed. For example, a step of the method may be modified or eliminated, or a new step may be added.

The method now proceeds to step 1335 of FIG. 13B.

The mixture is now placed on a transport vehicle, such as a truck, and transported to the delivery site specified in the order. The vehicle includes transport module 5, which may be a software application operating cm a processing device, for example. The vehicle may have one or more sensors to obtain data such as temperature of the mixture, water content of the mixture, etc. During transport, transport module 15 monitors the condition of the mixture and detects changes made to the mixture.

At step 1335, third information identifying a change made to the mixture produced during transport of the mixture is received, from a transport module, operating on a third device located on a vehicle transporting the mixture produced from the production facility to a delivery site. In the illustrative embodiment, the driver of the truck makes a change to the mixture during transport to the delivery site. For example, the driver may add additional water the mixture while the mixture is in the truck. Transport module 15 transmits an alert to master database module 11 and to alert module 17 indicating the change that was made, in one embodiment, the alert is transmitted in real time.

At step 1340, an alert is transmitted if the third information does not meet a third predetermined criterion, if the third information is not within pre-established tolerances, an alert is issued to the customer. In one embodiment, the alert is transmitted in real time.

In the illustrative embodiment, the mixture is delivered to the customer's construction site. At the customer's site, site module 16 monitors delivery of the mixture and performance of the mixture after delivery. At step 1345, fourth information relating to delivery of the mixture produced is received, from a site module operating on a fourth device associated with the delivery site. When the mixture is delivered to the specified delivery site, site module 16 transmits an alert to master database module indicating that the mixture has been delivered. In one embodiment, the alert is transmitted in real time.

At step 1350, an alert is transmitted if it is determined that the fourth information does not meet a fourth predetermined criterion. For example, if the delivery of the mixture occurs outside of a specified delivery time frame (e.g., if the delivery is late), master database module 11 (or alert module 17) may transmit an alert to the customer. In one embodiment, the alert is transmitted in real time.

The site, module 16 may also monitor certain performance parameters of the mixture after it is delivered and used. At step 1355, fifth information relating to a performance of the mixture is received, from the site module. After the mixture is used (e.g., when the concrete mixture is laid), site module 16 may transmit to master database module 11 information including performance data. In one embodiment, the information is transmitted in real time.

At step 1360, an alert is transmitted if it is determined that the fifth information does not meet a fifth predetermined criterion. Thus, if the performance data does not meet specified requirements, master database module 11 (or alert module 17) transmits an alert to the customer. In one embodiment, the alert is transmitted in real time.

As described above, alerts are issued at various stages of the production process to inform master database module 11 of events and problems that occur during production, transport, and delivery of the mixture. Master database module 11 (or alert module 17) may then alert the customer if a parameter does not meet specified requirements.

Master database module 11 may collect information from various modules involved in the production of a mixture, in real time, and provide the information to the customer, in real time. For example, when master database module 11 receives from a respective module information pertaining to the production of a mixture, master database module 11 may transmit an alert to the customer in the form of an email, or in another format.

In one embodiment, master database module 11 maintains a web page associated with a customer's order and allow the producer (and/or the customer) to access the web page. Information received from various modules involved in the production of the mixture may be presented on the web page, addition, information relating to cost analysis may be presented on the web page. For example, an analysis of the impact of a modification to the mixture formulation, a change to the mixture during production or transport, a delay in delivery, or any other event, on the cost of materials (COM) and/or on the producer's profitability may be provided on the web page.

Figure 14:
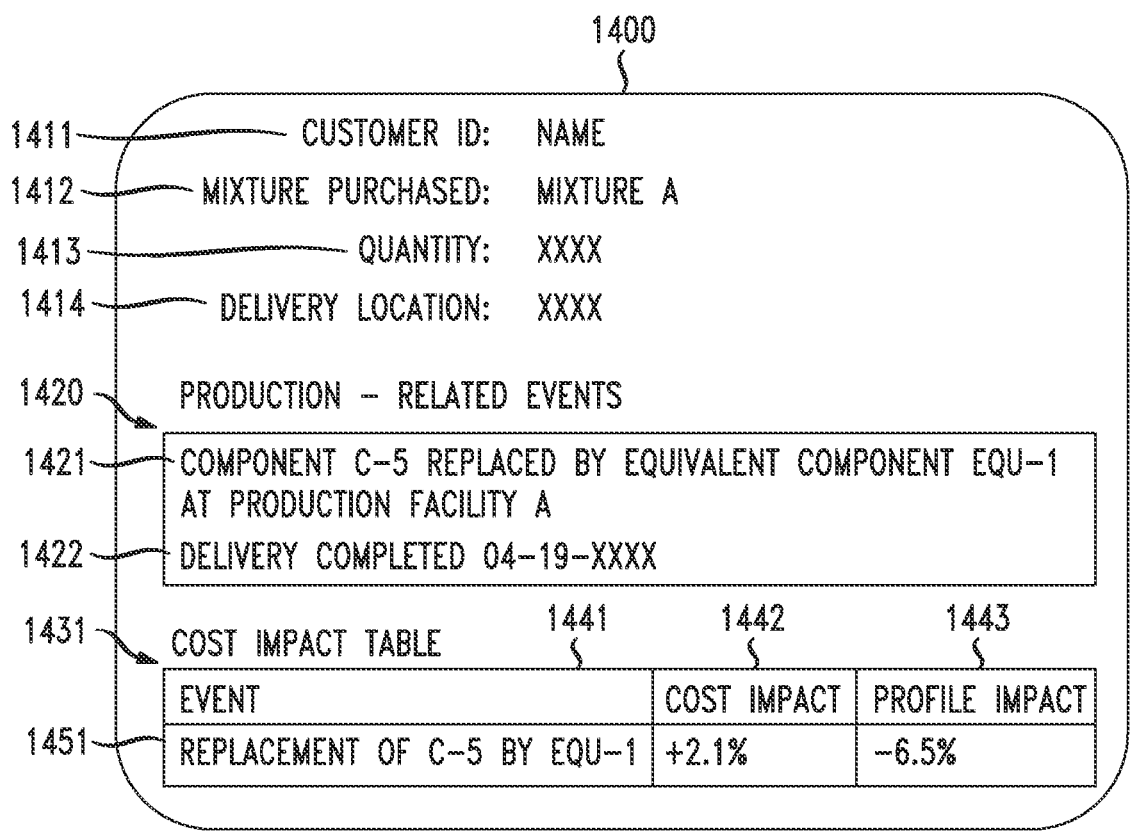
FIG. 14 shows an exemplary web page that displays information relating to purchase, production and delivery of a mixture in accordance with an embodiment.

FIG. 14 shows an exemplary web page that may be maintained in accordance with an embodiment. For example, access to the web page may be pro Wed to a producer to enable the producer to manage the production system and to control costs and profitability. Web page 1400 includes a customer ID field 1411 showing the customer's name or other identifier, a mixture purchased field 1412 showing the mixture that the customer purchased, a quantity field 1413 showing the quantity of the mixture ordered, and a delivery location field 1414 showing the delivery location specified by the customer.

Web page 1400 also includes a Production-Related Events field 1420 that lists events that occur during production of the mixture. Master database module 11 may display in field 1420 information received from various modules during production of the mixture, including information indicating modifications made to the mixture formulation prior to production, changes made to the mixture during transport of the mixture, information related to delivery, etc. In the illustrative embodiment of FIG. 14, field 1420 includes a first listing 1421 indicating that component C-5 of the mixture formulation was replaced by an equivalent component EQU-1 at Production Facility A (prior to production). Field 1420 also includes a second listing 1422 indicating that delivery of the mixture was completed on 04-19-XXXX.

Web page 1400 also includes a Cost Impact Table 1431 showing the expected impact of certain events on cost and profitability. Table 1431 includes an event column 1441, a cost impact column 1442 and a profitability impact column 1443. Master database module 11 accesses stored information concerning the costs of various components and calculates the expected impact of one or more selected events on the producer's costs. In the illustrative embodiment, row 1451 indicates that the replacement of C-5 by EQU-1 is expected to increase the cost of the mixture by +2.1%, and reduces the producer's profit by 6.5%.

In various embodiments, the method steps described herein, inducing the method steps described in FIGS. 2, 3, 4, 5, 6, 9, 12, and/or 13A-13B, may be performed in an order different from the particular order described or shown. In other embodiments, other steps may be provided, or steps may be eliminated, from the described methods.

Systems, apparatus, and methods described herein may be implemented using digital circuitry, or using one or more computers using well-known computer processors, memory units, storage devices, computer software and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client server relationship may be defined and controlled by computer programs running on the respective client and server computers.

Systems, apparatus, and methods described herein may be used within a network-based cloud computing system. In such a network-based cloud computing system, as server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g. to perform a calculation, to display specified data on a screen, etc.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 2, 3, 4, 5, 6, 9, 12, and/or 13A-13B, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 15:
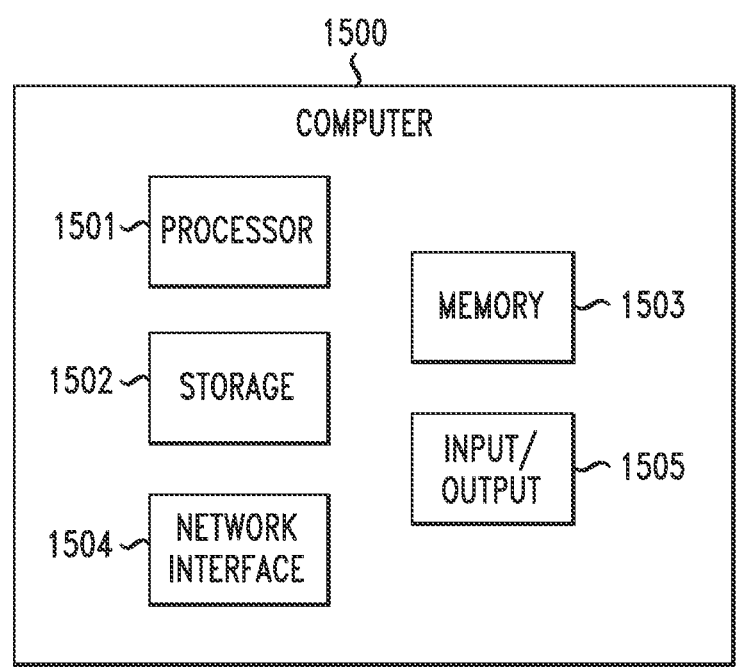
FIG. 15 is a high-level block diagram of an exemplary computer that may be used to implement certain embodiments.

A high-level block diagram of an exemplary computer that may be used to implement systems, apparatus and methods described herein is illustrated in FIG. 15. Computer 1500 includes a processor 1501 operatively coupled to a data storage device 1502 and a memory 1503. Processor 1501 controls the overall operation of computer 1500 by executing computer program instructions that define such operations. The computer program instructions A may be stored in data storage device 1502, or other computer readable medium, and loaded into memory 1503 when execution of the computer program instructions is desired. Thus, the method steps of FIGS. 2, 3, 4, 5, 6, 9, 12, and/or 13A-13B can be defined by the computer program instructions stored in memory 1503 and/or data storage device 1502 and controlled by the processor 1501 executing the computer program instructions. For example, the computer program instructions can be implemented as computer executable made programmed by one skilled in the art to perform an algorithm defined by the method steps of FIGS. 2, 3, 4, 5, 6, 12, and/or 13A-13B. Accordingly, by executing the computer program instructions, the processor 1501 executes an algorithm defined by the method steps of FIGS. 2, 3, 4, 5, 6, 9, 12, and/or 13A-13B. Computer 1500 also includes one or more network interfaces 1504 for communicating with other devices via a network. Computer 1500 also includes one or more input/output devices 1505 that cable user interaction with computer 1500 (e.g., display, keyboard, mouse, speakers, buttons, etc.).

Processor 1501 may include both general and special purpose microprocessors, and may be the sole processor or one of multiple processors of computer 1500. Processor 1501 may include one or more central processing units (CPUs), for example, Processor 1501, data storage device 1502, and/or memory 1503 may include, be supplemented by, or incorporated in, one or more application-specific integrated circuits (ASICs) and/or one or more field programmable gate arrays (FPGAs).

Data storage device 1502 and memory 1503 each include a tangible non-transitory computer readable storage medium. Data storage device 1502, and memory 1503, may each include high-speed random access memory, such as dynamic random access memory (DRAM), static random access memory (SRAM), double data rate synchronous dynamic random access memory (DDR RAM), or other random access solid state memory devices, and may include nom-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1505 may include peripherals, such as a printer, scanner, display screen, etc. For example, input/output devices 1505 may include a display device such as a cathode ray tube (CRT) or liquid crystal display (LCD) monitor for displaying information to the user, a keyboard, and a pointing device such as a mouse or a trackball by which the user can provide input to computer 1500.

Any or all of the systems and apparatus discussed herein, including master database module 11, input module 12, sales module 13, production module 14, transport module 15, site module 16, alert module 17, purchase module 18, and localization module 19, and components thereof, including mixture database 801 and local factors database 802, may be implemented using a computer such as computer 1500.

One skilled in the art will recognize that an implementation of an actual computer or computer system may have other structures and may contain other components as well, and that FIG. 15 is a high level representation some of the components of such a computer for illustrative purposes.

The foregoing Detailed Description is to be understood as being in every respect illustrative and exemplary, but not restrictive, and the scope of the invention disclosed herein is not to be determined front the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of producing a formulation-based product, the method comprising:
   storing, in a memory, a formulation of a concrete mixture, the formulation specifying a plurality of components and respective quantities;
   identifying, by a processor, a plurality of production facilities capable of producing the concrete mixture, each production facility associated with a respective locality, each production facility being located remote from the processor; and
   performing, by the processor, the following actions, for each respective one of the plurality of production facilities:
     identifying a factor that is associated with the corresponding locality and relates to a particular one of the plurality of components;
     modifying the formulation, based on the factor, to generate a localized version of the formulation for use at the respective production facility, wherein the localized version of the formulation includes a local component different from the plurality of components specified in the formulation;
     storing the localized version associated with the respective production facility in the memory, the memory being located remote from the respective production facility;
     receiving an order for the concrete mixture, the order specifying the concrete mixture and the plurality of components;
     selecting a production facility from among the plurality of production facilities;
     causing a localized concrete mixture including the local component to be produced at the selected production facility based on the localized version of the formulation;
     determining a first cost of the concrete mixture specified in the order and a second cost of the localized concrete mixture produced using the local component;
     determining an impact of use of the local component on the customer's profitability; and
     providing to the customer, via a network, access to a web page showing, simultaneously, information indicating the localized component, a difference between the first cost of the concrete mixture specified in the order and the second cost of the localized concrete mixture produced using the local component, and the impact of use of the local component on the customer's profitability.

2. The method of claim 1, further comprising:
   storing the localized version of the formulation in association with the formulation.

3. The method of claim 1, wherein modifying the formulation further comprises modifying a quantity associated with the particular one of the plurality of components.

4. The method of claim 1, wherein modifying the formulation further comprises adding a second component to the formulation.

5. The method of claim 1, further comprising:
   selecting a second plurality of production facilities from among the plurality of production facilities; and
   for each of the second plurality of production facilities:
     transmitting, to a system associated with the respective production facility, a respective localized version of the formulation associated with the respective production facility.

6. The method of claim 1, wherein the factor comprises one of a local cost factor, a local product availability factor, and a local market preference factor.

7. A production management system comprising:
   a plurality of production facilities, each production facility being adapted to produce one or more concrete mixtures;

a memory adapted to store a plurality of formulations, each formulation specifying a respective concrete mixture, a plurality of components associated with the respective concrete mixture, and, for each component, a quantity corresponding to the respective component;

a first processor adapted to:
  receive an order specifying one of the plurality of formulations, the specified formulation specifying at least a particular component and a particular quantity associated with the particular component;

a second processor adapted to:
  identify a local factor associated with a selected production facility, wherein the local factor affects one of an availability and a cost of the particular component; and
  determine a modified formulation of the concrete mixture, based on the local factor, wherein the modified formulation specifying a second non-zero quantity of the particular component, the second non-zero quantity being different from the particular quantity specified in the specified formulation;
  store the modified formulation in the memory; and
  cause the concrete mixture to be produced at the selected production facility, based on the modified formulation.

8. The production management system of claim 7, wherein the second processor is further adapted to:
  determine a theoretical cost of a theoretical concrete mixture produced according to the specified formulation and an actual cost of the concrete mixture produced based on the modified formulation; and
  store, in the memory, the order, first information indicating the change from the particular quantity to the second non-zero quantity and second information indicating a difference between the theoretical cost and the actual cost.

9. The production management system of claim 8, wherein the second processor is further adapted to:
  cause a processing device to display the difference between the theoretical cost and the actual cost.

10. The production management system of claim 8, wherein the second processor is further adapted to:
  cause a processing device to display an impact on profitability caused by use of the modified formulation.

11. The production management system of claim 7, wherein the second processor is further adapted to:
  determine that a local version of the modified formulation stored in a second memory located at the selected production facility is different from the modified formulation; and
  update the local version of the modified formulation based on the modified formulation.

12. The production management system of claim 7, wherein the second non-zero quantity is less than the particular quantity.

13. The production management system of claim 7, wherein the particular component is one of water, cementitious, fly ash, fine aggregate, and course aggregate.

14. The production management system of claim 7, further comprising:
  a second memory adapted to store information indicating, for each of the plurality of production facilities, a respective local factor that affects one of an availability and a cost of one or more components associated with the specified formulation.

15. A system of interconnected elements used in a production management system, the system comprising:

a plurality of concrete production facilities, each concrete production facility being adapted to produce one or more concrete mixtures, each concrete production facility comprising a processing device adapted to control production of concrete mixtures at the respective concrete production facility;

a network adapted to carry communications;

a processing device linked to each of processing devices located at the plurality of production facilities via the network, the processing device comprising:
  a memory adapted to store a plurality of formulations, each formulation specifying a respective concrete mixture, a plurality of components associated with the respective concrete mixture, and, for each component, a quantity corresponding to the respective component;
  a processor adapted to:
    receive an order specifying one of the plurality of formulations, the specified formulation specifying a concrete mixture having at least a particular component and a particular quantity associated with the particular component;
    identify a local factor associated with a selected one of the concrete production facilities, wherein the local factor affects one of an availability and a cost of the particular component; and
    determine a modified formulation of the specified concrete mixture, based on the local factor, wherein the modified formulation specifying a second non-zero quantity of the particular component, the second non-zero quantity being different from the particular quantity specified in the specified formulation;
    store the modified formulation in the memory; and
    instruct the processing device of the selected concrete production facility to produce the specified concrete mixture, based on the modified formulation.

16. The system of claim 15, wherein the second processor is further adapted to:
  determine a theoretical cost of a theoretical concrete mixture produced according to the specified formulation and an actual cost of the concrete mixture produced based on the modified formulation; and
  store, in the memory, the order, first information indicating the change from the particular quantity to the second non-zero quantity and second information indicating a difference between the theoretical cost and the actual cost.

17. The system of claim 16, wherein the processor is further adapted to:
  cause a second processing device to display the difference between the theoretical cost and the actual cost.

18. The system of claim 16, wherein the processor is further adapted to:
  cause a second processing device to display an impact on profitability caused by use of the modified formulation.

19. The system of claim 15, wherein the second processor is further adapted to:
  determine that a local version of the modified formulation stored in a second memory located at the selected production facility is different from the modified formulation; and
  update the local version of the modified formulation based on the modified formulation.

20. The system of claim 15, wherein the second non-zero quantity is less than the particular quantity.

21. The system of claim 15, wherein the particular component is one of water, cementitious, fly ash, fine aggregate, and course aggregate.

\* \* \* \* \*